United States Patent [19]

Kawai

[11] Patent Number: 5,014,116
[45] Date of Patent: May 7, 1991

[54] COLOR TELEVISION SYSTEM

[75] Inventor: Kiyoyuki Kawai, Kanagawa, Japan

[73] Assignee: Kabushiki Kaisha Toshiba, Kanagawa, Japan

[21] Appl. No.: 321,120

[22] Filed: Mar. 10, 1989

[30] Foreign Application Priority Data

Mar. 10, 1988 [JP] Japan ................................ 63-56848
Mar. 10, 1988 [JP] Japan ................................ 63-56850

[51] Int. Cl.$^5$ ...................... H04N 11/14; H04N 11/06
[52] U.S. Cl. ....................................... 358/12; 358/141
[58] Field of Search ................................. 358/12, 141

[56] References Cited

U.S. PATENT DOCUMENTS 4,660,072  4/1987  Fukinuki ............................... 358/12
4,839,720  6/1989  Isnardi .................................. 358/141
4,884,127  11/1989 Isnardi et al. ......................... 358/12

FOREIGN PATENT DOCUMENTS 0294738  12/1988  European Pat. Off. .
0330279  8/1989   European Pat. Off. .
0285894  12/1986  Japan .
0206992  9/1987   Japan .
0097084  4/1988   Japan .

OTHER PUBLICATIONS

Jpseph L. LoCicero et al., "A Compatible High–Definition Television System (SLSC) with Chrominance and Aspect Ratio Improvements", SMPTE Journal, pp. 546–558, May 1985.
Takahiko Fukinuki et al., "Extended Definition TV Fully Compatible with Existing Standards", IEEE Transactions on Communications, vol. COM-32, No. 8, pp. 948–953, Aug. 1984.
E. Dubois et al., "Three-Dimensional Spectrum and Processing of Digital NTSC Color Signals", SMPTE Journal, pp. 372–378, Apr. 1982.
Makoto Miyahara, "Analysis of Perception of Motion in Television Signals and Its Application to Bandwidth Compression", NHK Technical Research Laboratories Report, vol. 27, No. 4, pp. 141–171, 1975.
Minoru Honda et al., "Characteristics of Luminance Signal Bandwidth Extension in Extended Definition TV", National Convention Record of ITE of Japan, pp. 317–318, Jul. 1989.
Kiyoyuki Kawai et al., "A Compatible Wide Aspect Ratio TV", IEEE Digest of Technical Papers 1988 ICCE, pp. 136, 137, Jun. 8–10, 1988.

*Primary Examiner*—John W. Shepperd
*Attorney, Agent, or Firm*—Finnegan, Henderson, Farabow, Garrett, and Dunner

[57] ABSTRACT

A wide aspect ratio screen color television system, such as a 16:9 aspect ratio screen television system, includes a signal generating circuit for generating the wide aspect ratio screen color television signal with a predetermined two-dimensional frequency band, a screen separating circuit for separating the color television signal into at least a first television signal relating to a relatively narrow aspect ratio portion and second television signal relating to an excess portion thereof, a circuit for eliminating a prescribed high frequency region of the two-dimensional frequency band of the first television signal, a signal suppressing circuit for suppressing the frequency band of the second television signal and a signal multiplexing circuit for multiplexing the suppressed second television signal onto the two-dimensional high frequency band region in place of the eliminated portion of the first television signal.

4 Claims, 25 Drawing Sheets

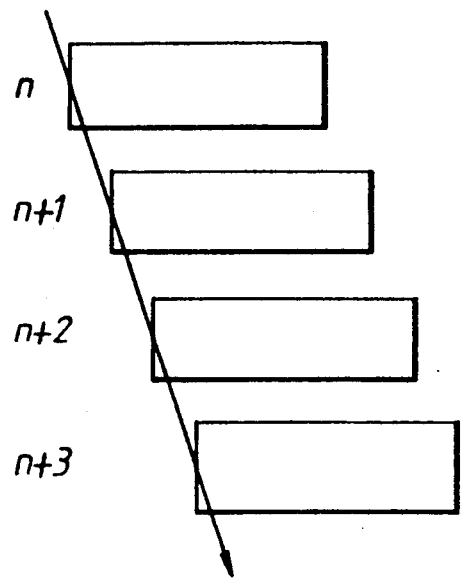 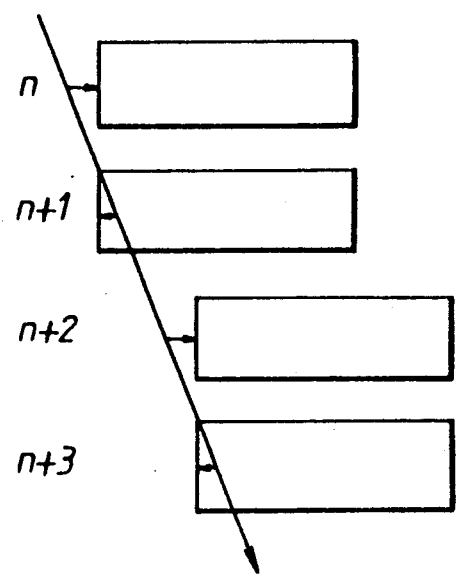
FIG. 13(a)    FIG. 13(b)
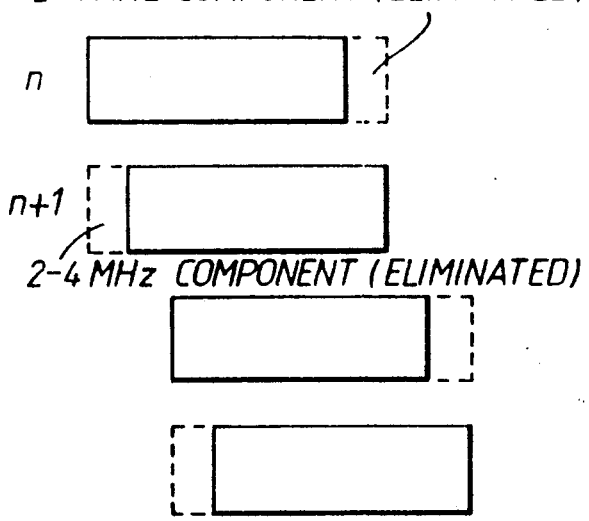 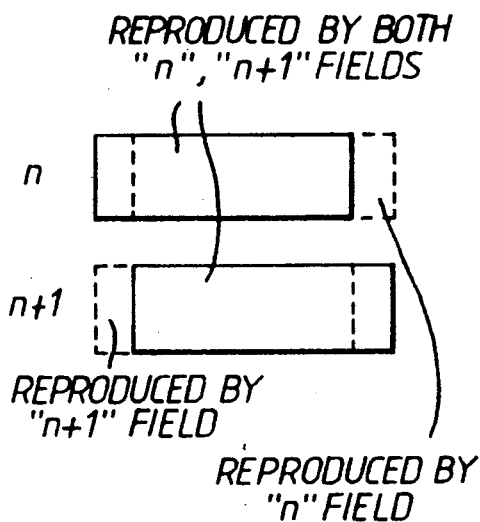
FIG. 14(a)    FIG. 14(b)

COLOR TELEVISION SYSTEM

FIELD OF THE INVENTION

The present invention relates generally to a color television system, and more particularly, to a color television system in which a wide-band television video signal is transmitted in a frequency band of the conventional television system.

BACKGROUND OF THE INVENTION

Recently, a new television system which offers to viewers an improved television picture has been researched. The system will be referred to as an improved picture television system hereafter. The improved picture television system will provide an improved picture resolution and/or a wide-screen picture. For example, an improved definition television system (referred to as an IDTV system hereafter) has been developed as one of the improved picture television systems.

Such an improved picture television is intended to have a compatibility with current television receivers widely used according to a prescribed current television system, e.g., the NTSC system, the PAL system and the SECAM system. This is because it is desirable that programs transmitted by the improved picture television system can be received by television receivers for both the current television system and the new system.

In the improved picture television system, e.g., the IDTV system, following two items have been particularly researched for improving the television picture.
(1) Aspect ratio (the ratio of the width to the height of a displayed picture) for providing a wide-screen picture:
(2) Horizontal resolution for improving the picture resolution:

A current color television system, such as the NTSC color television broadcasting system has a 4:3 aspect ratio and a horizontal resolution of 330 TV-lines. The NTSC color television broadcasting system is adopted in the United States, Japan and elsewhere. The NTSC system has been appraised as a color television broadcasting system compatible with the monochrome television broadcasting system and has a sufficient performance for color television broadcasting.

As to an improvement of the aspect ratio, some proposals are now presented. For example, a 5:3 aspect ratio, a 6:3 aspect ratio, a 16:9 aspect ratio, etc. are proposed.

As to an improvement of the horizontal resolution, the horizontal resolution of the current system is limited up to 330 TV-lines due to the transmission frequency band specified by the NTSC standard is limited to 4.2 MHz. While, a vertical resolution of the current system is about 450 TV-lines (effective resolution is 480 TV-line, but about 30 TV-lines are over-scanned). Therefore, it is desirable to increase the horizontal resolution from a viewpoint of balance to the vertical resolution.

A system which aims to improve both the above two items, i.e., the aspect ratio and the horizontal resolution, and has a compatibility with current television receivers is proposed, e.g., in the article entitled "A Compatible High-Definition Television System (SLSC) with Chrominance and Aspect Ratio Improvements" by Joseph L. LoCicero et al., SMPTE Journal, May 1985.

Referring now to FIG. 1, the SLSC (abbreviation of Split Luminance, Split Chrominance) system will be briefly described below. FIG. 1 shows a frequency spectrum diagram of composite signal according to the SLSC system. In FIG. 1, the frequency band 0-4.2 MHz carries a signal having a compatibility with current NTSC system television receivers (the signal will be referred to as a current television picture signal hereafter). The frequency band 4.9-10.1 MHz carries an additional signal for improving the television picture (the signal will be referred to as a picture improving signal hereafter), i.e., for increasing the aspect ratio and resolutions of luminance and chrominance. That is, the extra frequency band 4.9-10.1 MHz is used for transmitting the picture improving signal in the SLSC system.

According to the SLSC system, the lower frequency band 0-4.2 MHz carries the current television picture signal but does not carry the picture improving signal. Therefore, the SLSC system has not only a compatibility but also a high disturbance rejectivity. However, the SLSC system using such a wider transmission frequency band is not effective for channel allocation. Especially, the SLSC system is not acceptable for broadcast service areas where a lot of channels are condensed in a limited television broadcasting frequency band. Furthermore, most broadcasting facilities used for the current television system are not equipped for the transmission of such a wide frequency band of up to 10 MHz. Therefore, current broadcasting television facilities must be replaced by new wide frequency band facilities for the SLSC system at a huge cost.

Therefore, it is desirable to transmit both a current television picture signal and a picture improving signal by using only one channel frequency band, i.e., 0 to 4.2 MHz. Such a system capable of transmitting the signals by the frequency band 0 to 4.2 MHz will have a good compatibility with current broadcasting facilities, such as transmitters and video tape recorders.

To transmit both a current television picture signal and a picture improving signal with one channel frequency band, a signal multiplexing system has been also researched. For example, such a multiplex system is proposed in the article entitled "Extended Definition TV Fully Compatible with Existing Standards" by T. Fukinuki et al., IEEE Transaction on Communications, Vol. COM-32, No. 8, August 1984.

Referring now to FIG. 2, the multiplex system will be briefly described below. FIG. 2 shows a temporary frequency to vertical frequency co-ordinate diagram representing a television signal according to the multiplex system. According to the multiplex system, a detail signal component YH of a luminance signal (the luminance signal component of frequency band 4 to 6 MHz, the component YH, will be referred to as a high frequency luminance signal hereafter) is multiplexed to a specific spectrum region of a current television signal according to the NTSC system. The specific spectrum region exists in small diamonds YH in the first and third quadrants of the co-ordinate diagram, as shown in FIG. 2. On the other and, a chrominance signal C exists in two other small diamonds C in the second and fourth quadrants.

The small diamonds YH are left unused in a case of static picture, but the small diamonds YH are filled in a case of dynamic picture. Thus, the multiplex system can be adopted for improving definition of picture in the case of static picture.

On the other hand, a television system for the increased aspect ratio picture (the system will be referred to as a wide-screen television system hereafter) must transmit the picture improving signal in either of the static picture or the dynamic picture. Therefore, such a multiplex system proposed in the "Extended Definition TV Fully Compatible with Existing Standards" is difficult to be adopted for the wide-screen television system. For adopting the multiplex system to the wide-screen television system, a dynamic picture component must be depressed or limited. However, the depression of the dynamic picture component will damage a natural movement of the picture. As a result, the multiplex system is less compatible for current television receivers.

The high frequency luminance signal component YH of a general television picture is very low in level in comparison to a low frequency luminance signal component YL. Thus, the high frequency luminance signal component YH is less harmful for the current television receivers, and the component YH is multiplexed for improving the definition of the picture. On the other hand, the wide-screen television system is required to transmit a relatively high level picture improving signal. This is because the picture improving signal for the wide-screen television system includes not only the Low level high frequency luminance signal component YH but also the high level low frequency luminance signal component YL. If the picture improving signal is transmitted after a level suppressed, the received picture has a decreased S/N (signal to noise) ratio.

Therefore, a transmission of the picture improving signal by using the conventional television signal band of 4.2 MHz requires that;

(1) The picture improving signal is transmittable for both the dynamic picture and the static picture;
(2) The picture improving signal gives little disturbance to conventional television receivers; and
(3) Wide-screen television receivers can receive the picture improving signal at a sufficient S/N.

However, there has been developed a system that can meet all of the requirements.

SUMMARY OF THE INVENTION

It is, therefore, an object of the present invention to provide a color television system in which a wide-band television video signal is transmitted in a frequency band of the conventional television system.

It is another object of the present invention to provide a color television system which transmits an additional signal for improving the picture for both the dynamic picture and the static picture.

It is another object of the present invention to provide a color television system which transmits an additional picture improving signal and gives little disturbance to conventional television receivers.

It is another object of the present invention to provide a color television system in which an additional picture improving signal can be transmitted with a sufficient level.

In order to achieve the above objects, a color television system according to one aspect of the present invention includes a signal generating circuit for generating the wide aspect ratio screen color television signal with a predetermined two-dimensional frequency band, a screen separating circuit for separating the color television signal into at least a first television signal relating to a relatively narrow aspect ratio portion and a second television signal relating to an excess portion thereover, a circuit for eliminating a prescribed high frequency region of the two-dimensional frequency band of the first television signal, a signal suppressing circuit for suppressing the frequency band of the second television signal and a signal multiplexing circuit for multiplexing the suppressed second television signal onto the two-dimensional high frequency band region in place of the eliminated portion of the first television signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 13 and 14 are graphs for illustrating the operation of the circuit of FIG. 10;

DESCRIPTION OF THE PREFERRED EMBODIMENTS

Figure 1:
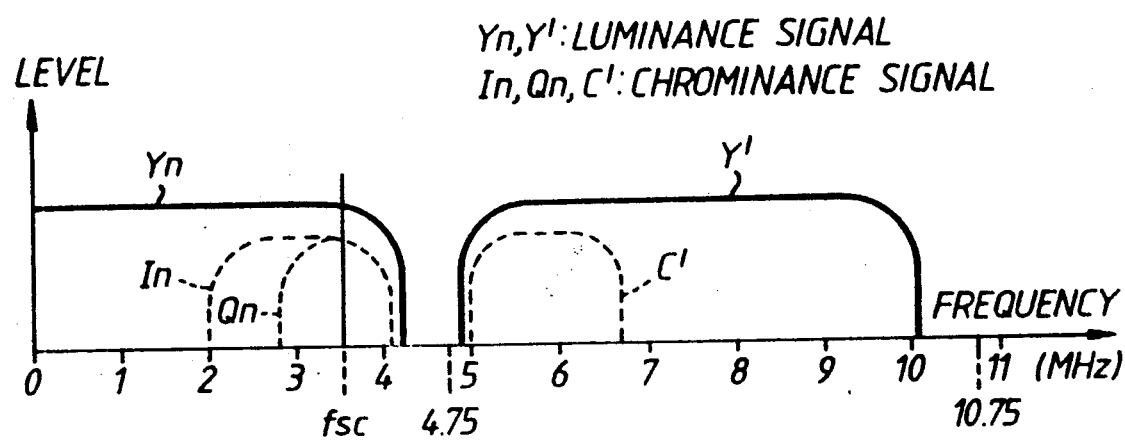
FIGS. 1 and 2 are graphs for illustrating the operation of conventional color television systems
Figure 2:
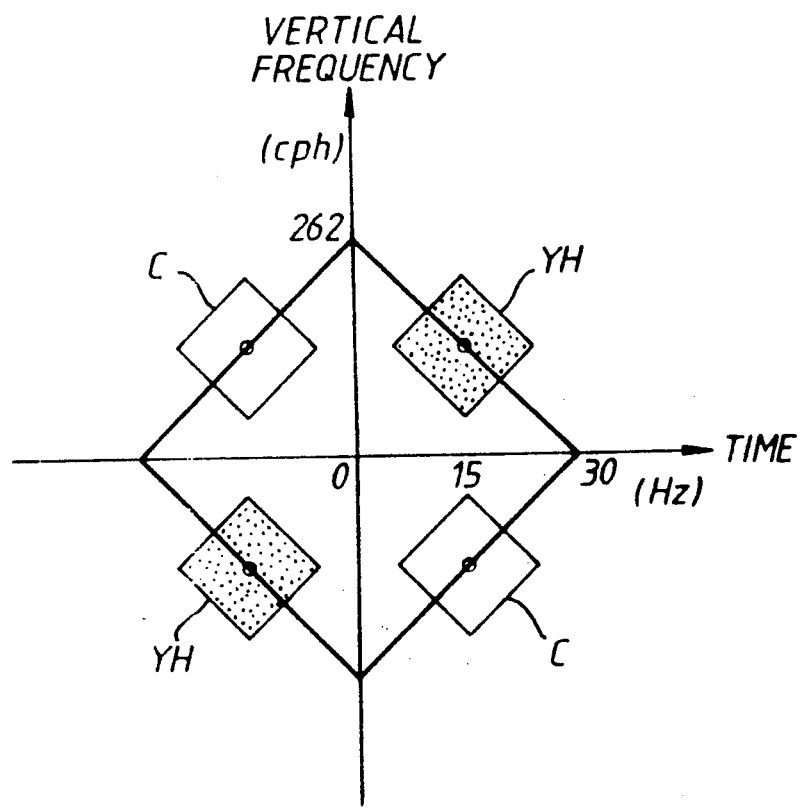

The present invention will be described in detail with reference to the FIGS. 3 through 29. Throughout the drawings, reference numerals or letters used in FIGS. 1 and 2 (Prior Art Figures) will be used to designate like or equivalent elements for simplicity of explanation.

Figure 3:
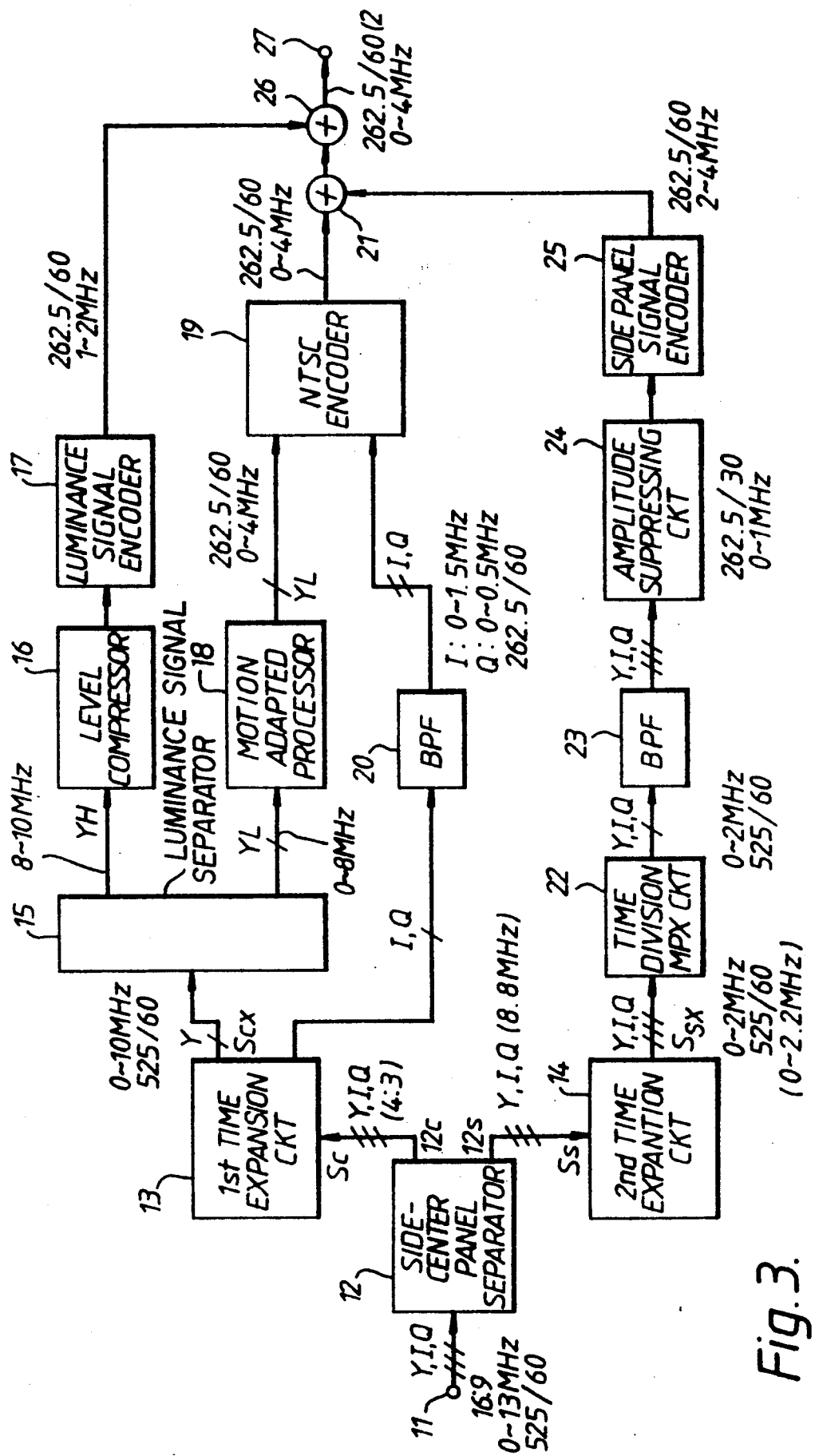
FIG. 3 is a block diagram showing a television signal transmitter according to the present invention.

Referring now to FIG. 3, an embodiment of the color television system according to the present invention will be described in detail. FIG. 3 shows a block diagram of a color television signal encoder according to the color television system of the present invention.

In FIG. 3, an input terminal 11 is provided for receiving a wide-screen color camera signal comprising color signals Y, I, Q. The wide-screen color camera signal is generated as follows. A wide-screen camera (not shown) provides wide-screen color signal with R, G, B components, an aspect ratio of 16:9, scanning parameters of 525 lines in a progressing scan and a frame frequency of 59.94 Hz (referred to as its approximated value; 60 Hz hereafter) in this example. The progressive scan signal is represented by 525/60 in the drawing. A wide-screen camera is essentially identical to a standard NTSC camera except that a wide-screen camera has a greater aspect ratio and a greater video bandwidth. The video bandwidth of a wide-screen camera is proportional to the product of its aspect ratio and the total number of scanning lines per frame, among other factors. Assuming constant velocity scanning by the wide-screen camera, an increase in its aspect ratio causes a corresponding increase in its video bandwidth as well as horizontal compression of picture information when the signal is displayed by a standard television receiver with a 4:3 aspect ratio. For those reasons, it is necessary to modify the wide-screen signal for full NTSC compatibility.

The color signal contains both luminance and chrominance signal components. The luminance and chrominance signals contain both low and high frequency information, which in the following discussion will be referred to as "lows" and "highs", respectively.

The wide-screen R, G, B components are matrixed to derive luminance component Y and color difference signals I and Q. The wide-screen color signals Y, I, Q are sampled at a four-times chrominance subcarrier rate (4×fsc) and are converted from analog to digital (binary) form individually by separate analog-to-digital converters (referred to as ADC's hereafter).

Figure 4:
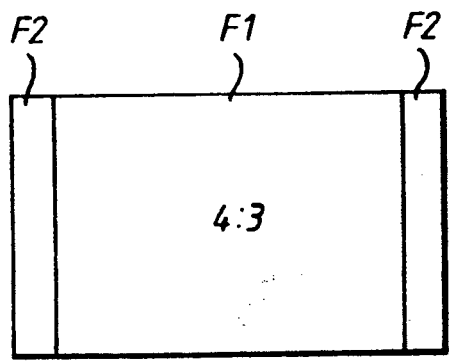
FIGS. 4 through 7 are graphs for illustrating the operation of the transmitter of FIG. 3.

The color camera signal is applied to a side-center panel signals separator 12. Referring now to FIG. 4, an operation of the side-center panel signals separator 12 will be described.

FIG. 4 illustrates an image area having the 16:9 aspect ratio screen which is displayed by the color camera signal. It may represent a display image area such that of a cathode ray tube for displaying a picture having the 16:9 aspect ratio screen picture. Alternatively, it may represent a television camera image area having the 16:9 aspect ratio screen. In FIG. 4, an inner rectangle F1 defines an area having a conventional 4:3 aspect ratio screen. The area F1 is referred to as the center panel hereafter. An outer rectangle encompasses an area having the 16:9 aspect ratio screen. The area comprises the center panel F1 and two side areas F2. Each side area F2 is referred to as a side panel hereafter.

The side-center panel signals separator 12 separates the color camera signal. Thus, a signal representing the center panel F1 and two other signals representing the side panels F2 are output from first and second output terminals 12c and 12s, respectively. The former signal will be referred to as the center panel signal Sc hereafter. The latter signal will be referred to as side panel signal Ss hereafter.

Figure 5:
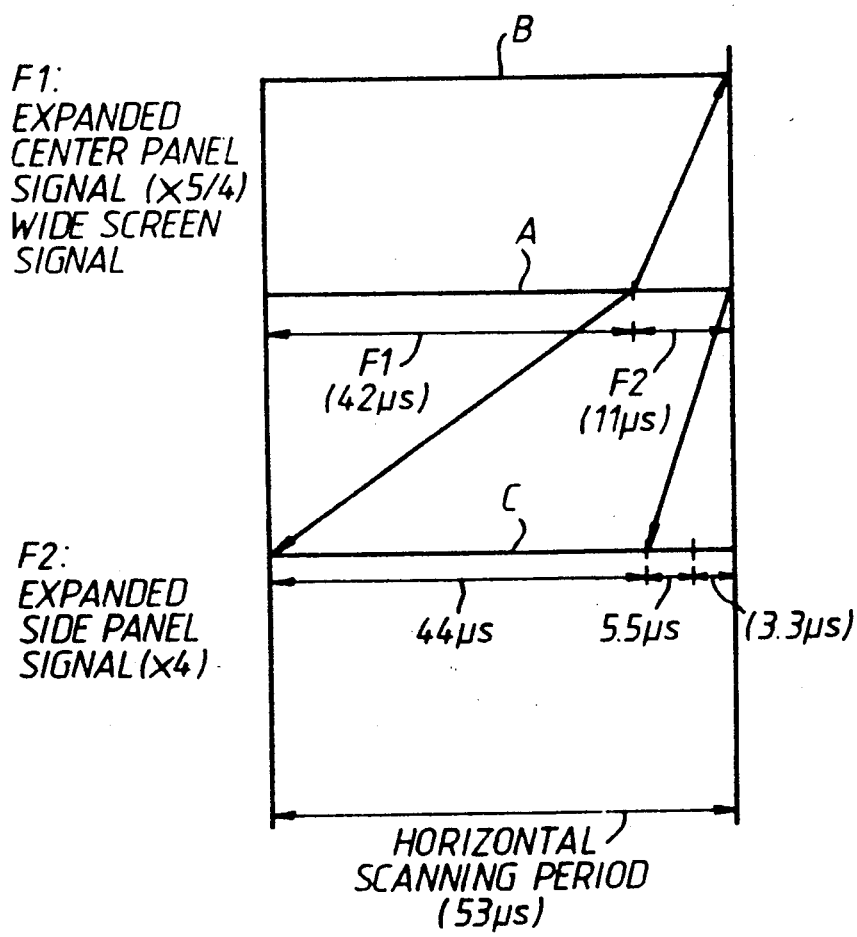

The center panel signal Sc is applied to a first time expansion circuit 13. The first time expansion circuit 13 expands the time axis of the center panel signal Sc to 5/4 times. The side panel signals Ss are applied to a second time expansion circuit 14. The second time expansion circuit 14 expands the time axis of the side panel signals Ss to 4 times. The expansion of the time axis for both signals Sc and Ss is illustrated in FIG. 5. In FIG. 5, a middle horizontal line graph A represents the time axis lengths of the color camera signal. The length of the horizontal line represents an effective horizontal scanning period converted to the interlace scanning. The line graph A has the time axis length of 53 μs in total. The total length of 53 μs of the line graph A is assigned to two sections F1 and F2 having the lengths of 42 μs and 11 μs, respectively. The sections F1 and F2 correspond to the center panel signal Sc and the side panel signal Ss, respectively. The assignment of the line graph A is defined as follows;

$$42 + 11 : 42 \times (\tfrac{3}{4}) = 5:3$$

Thus, the assignment corresponds to the 5:3 aspect ratio screen signal.

The section F1 on the graph A corresponds to the center panel signal Sc. The section F1 is expanded by 5/4 times in the first time expansion circuit 13. Thus, the expanded center panel signal Scx has the time axis length of 53 μs, as shown by the top horizontal line graph B. The section F2 on the graph A corresponds to the side panel signal Ss. The section F2 is expanded by 4 times in the second time expansion circuit 14. Thus, the expanded side panel signal Ssx has the time axis length of 44 μs, as shown by the bottom horizontal line graph C. The expanded side panel signal Ssx is shorter than the expanded center panel signal Scx by the time axis length of 9 μs. The time axis length of 9 μs is left for an overscanning area. The overscanning area is remained in the conventional television receivers.

The side panel signal Ss can be expanded to the time axis length of 49.5 μs. In this case, the assignment corresponds to the 16:9 aspect ratio screen signal. And about the time axis length of about 3.5 μs (6%) is left for the margin of the overscanning area.

The frequency band of the expanded center panel signal Sc is decreased to 0-10 MHz according to the time axis expansion. The luminance component Y in the expanded center panel signal Sc is applied to a luminance signal separator 15. The luminance signal separator 15 separates the luminance component Y into a high frequency luminance signal YH with the frequency band of 8-10 MHz and a low frequency luminance signal YL with the frequency band of 0-8 MHz. The high frequency luminance signal YH is applied to a luminance signal encoder 17 through a level compressor 16. The level compressor 16 compresses the high frequency luminance signal YH to a predetermined compressed level. The luminance signal encoder 17 converts the high frequency luminance signal YH to an encoded high frequency luminance signal suitable for multiplexing with other signals, as described later.

Figure 6A:
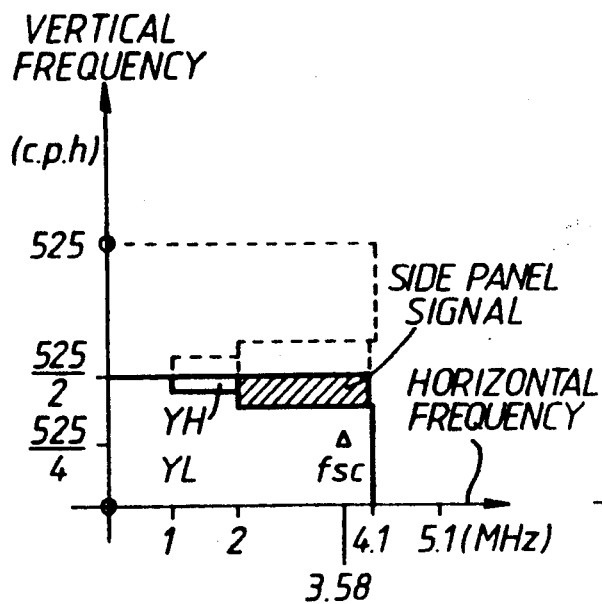

The low frequency luminance signal YL is applied to an NTSC encoder 19 through a motion adapted processor 18. The motion adapted processor 18 modifies the low frequency luminance signal YL to a signal suitable for multiplexing with the encoded high frequency luminance signal YH and the expanded side panel signal Ss. The NTSC encoder 19 encodes the low frequency luminance signal YL so that the frequency spectrum of the low frequency luminance signal YL is limited to the band as shown in FIG. 6(a). In FIG. 6(a), the vertical frequency $\gamma$ is plotted along the axis of the ordinate, and the spatial frequency $\mu$ in the horizontal direction (referred to as the "horizontal frequency" hereafter) is plotted along the axis of abscissa. In the drawing, the region contained in a rectangle YL represents the low frequency luminance signal YL, while the portion contained in a rectangle YH represents the high frequency luminance signal YH to be multiplied to the low frequency luminance signal YL later. The expression of these signals in the spatiotemporal frequency domain has already been known (e.g., E. Dubios, et al. "Three Dimensional Spectrum and Processing of Digital NTSC Color Signals", SMPTE (ed.) Digital Video No. 3. pp. 72–84, June 1980; hence, any more detailed description thereof is omitted.

The color difference signals I and Q in the expanded center panel signal Sc output from the first time expansion circuit 13 are applied to the NTSC encoder 19 through a band pass filter 20. Due to the band pass filter 20, the color difference signals I and Q in the frequency band are provided in the NTSC standard. The NTSC encoder 19 converts the color difference signals I and Q as well as the low frequency luminance signal YL output from the motion adapted processor 18 to an NTSC color television signal. The NTSC color television signal obtained by the NTSC encoder 19 is applied to a first adder 21.

Figure 7:
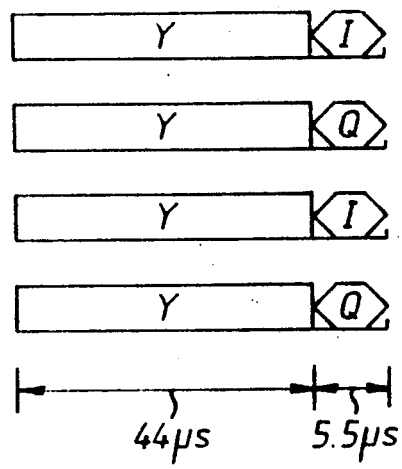

The side panel signal Ss has a frequency band of 0–2.2 MHz, after being time expanded by the second time expansion circuit 14. The time expanded side panel signal Ss is applied to a time-division multiplex circuit 22. In the time-division multiplex circuit 22, a frequency band of the color difference signals I and Q in the time expanded side panel signal Ss are limited to 0–0.25 MHz. Then, the color difference signals I and Q are multiplexed with each other in a progressive scan manner. The progressive scan multiplex signal is again multiplexed with the luminance signal Y in the time expanded side panel signal Ss in a time-division manner. Thus, a time-division multiplex signal, as shown in FIG. 7, is obtained.

Further, amplitudes of the color difference signals I and Q in the time-division multiplex signal are expanded by 1.33 (4/3) times in the time-division multiplex circuit 22. According to the amplitude expansion, the S/N of the color difference signals I and Q is improved to the similar degree with the S/N of the color difference signals I and Q in the center panel signal Sc in television receivers.

The time-division multiplex signal output from the time-division multiplex circuit 22 is applied to a band pass filter 23. The band pass filter 23 suppresses the spatiotemporal frequency band of the time-division multiplex signal. Thus, the vertical frequency of the time-division multiplex signal is suppressed to 525/4 cph (cycle per height) per 1/30 Sec. The spatial frequency of the time-division multiplex signal is suppressed to 0–1 MHz per 1/30 Sec.

The band suppressed signal output from the band pass filter 23 is applied to a side panel signal encoder 25 through an amplitude suppressing circuit 24. The amplitude suppressing circuit 24 suppresses the amplitude of the time-division multiplex signal to a prescribed level. The side panel signal encoder 25 converts the time-division multiplex signal of the side panel color signals Y, I and Q to an encoded signal suitable for multiplexing with the color signals YH, YL, I and Q in the center panel signal Sc.

Figure 6B:
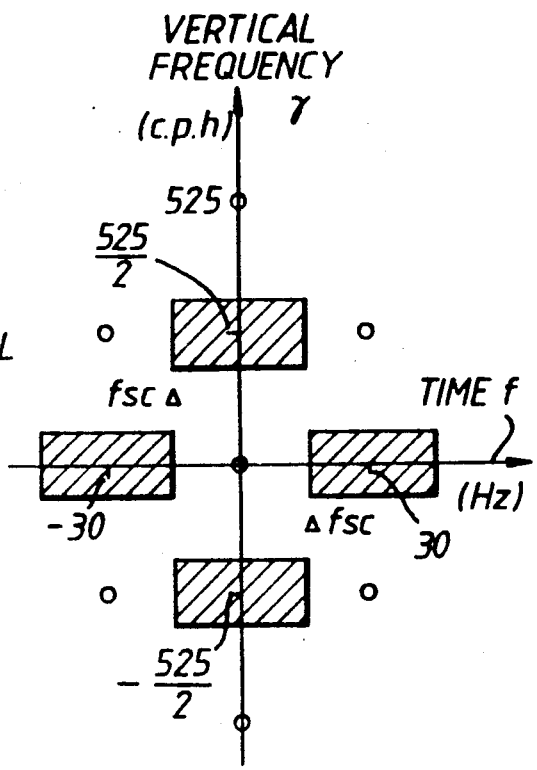

The encoded signal output from the side panel signal encoder 25 has a frequency spectrum corresponding to hatching rectangles Ss, as shown in FIGS. 6(a) and 6(b). FIG. 6(b) shows a temporary frequency to vertical frequency co-ordinate diagram representing a television signal according to the multiplex system of FIG. 4. In FIG. 6(b), the abscissa f and the the ordinate $\gamma$ express the temporal frequency and the vertical frequency in a manner similar to that of FIG. 2. As shown in FIG. 6(a), the encoded signal of the side panel signal Ss is located in a region separable from the region corresponding to the center panel signal Sc by both horizontal and vertical frequency axes.

The encoded signal output from the side panel signal encoder 25 is applied to the first adder 21. Thus, the encoded signal is combined with the NTSC color television signal output from the NTSC encoder 19. The combined signal output from the first adder 21 is applied to a second adder 26. The second adder 26 adds the combined signal output from the first adder 21 to the encoded high frequency luminance signal YH output from the luminance signal encoder 17. A combined signal output from the second adder 26 is transmitted to television receivers as a television signal.

Figure 8:
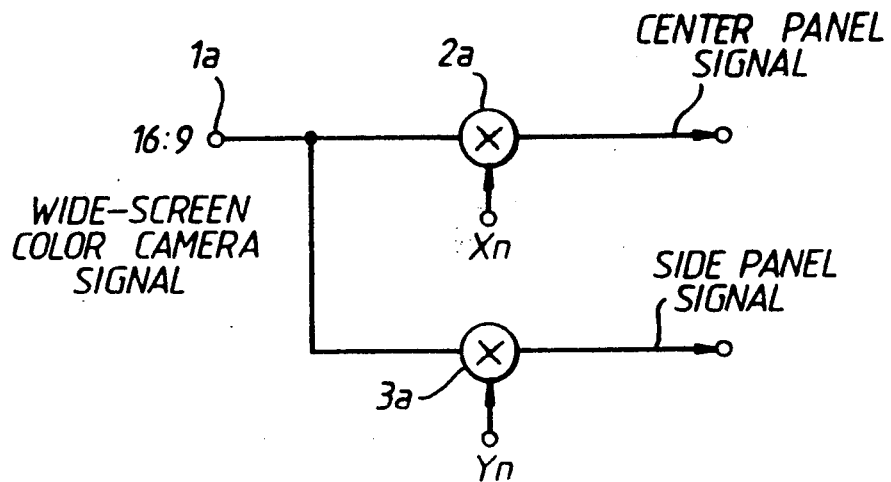
FIG. 8 is a block diagram showing the side-center panel signals separator 12 of FIG. 3.
Figure 9:
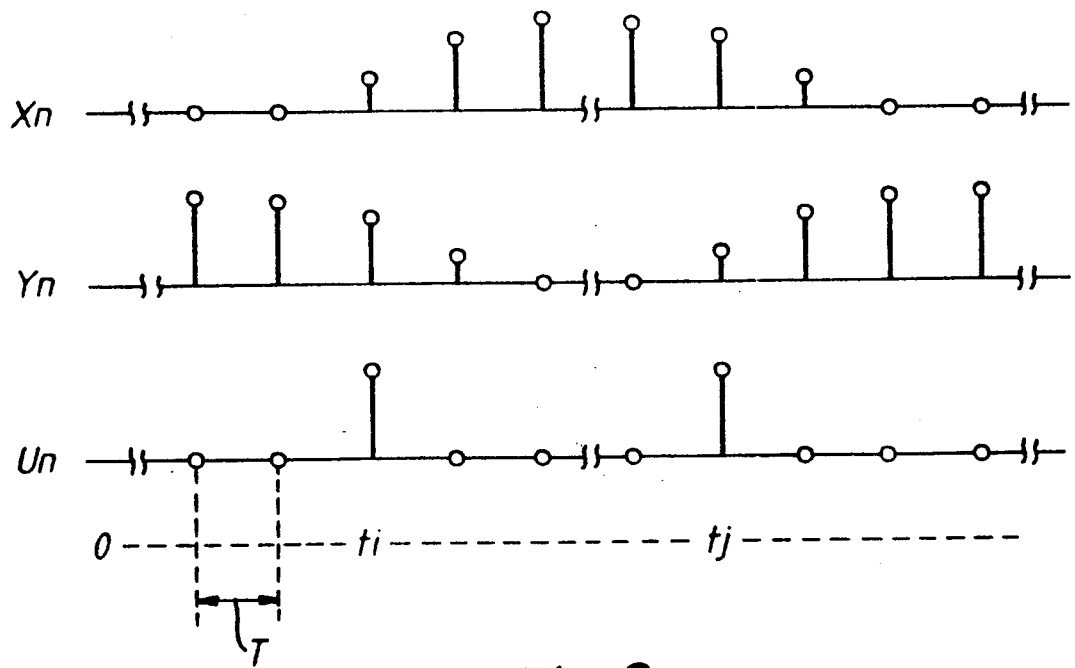
FIG. 9 is a graph for illustrating the operation of the circuit of FIG. 8.

Referring now to FIG. 8, a detail of a circuit comprising the side-center panel signal separator 12 will be described. The side-center panel signal separator 12 comprises first and second multipliers 2a and 3a. The 16:9 aspect ratio color camera signal is applied to both the first and second multipliers 2a and 3a through an input terminal 1a. The 16:9 aspect ratio color camera signal is a digital signal discreted at a period of, e.g., 1/(5.0.fsc) (fsc represents the color subcarrier frequency or 3.579545 MHz≈3.58 MHz). The period of 1/(5.0.fsc) will be represented as a reference T hereafter. The first and second multipliers 2a and 3a are also supplied with first and second control signals Xn and Yn, as shown in FIG. 9, respectively. Thus, the 16:9 aspect ratio color camera signal applied to the first multiplier 2a is weighted by the first control signal Xn. The 16:9 aspect ratio color camera signal applied to the second multiplier 3a is weighted by the second control signal Yn.

In FIG. 9, the first and second control signals Xn and Yn are shown with respect of a timing control signal Un for controlling the change of the side panels F2 and the center panel F1. The timing control signal Un has a timing pulse for changing the left panel F2 to the center panel F1 at a time ti and another timing pulse for changing the center panel F1 to the right panel F2 at a time tj. The timing control signal Un is transmitted independently to the television signal. Thus, receivers reproduce the 16:9 aspect ratio wide-screen images in accordance with the timing control signal Un.

Pulse amplitudes of the first and second control signals Xn and Yn vary in accordance with sinusoidal envelopes, as shown in FIG. 9. The first and second control signals Xn and Yn are expanded in time later by 5/4 times later in the first and second time expansion circuits 13 and 14, respectively. Further, the first and second control signals Xn and Yn are expanded in time by 2 times for the interlace conversion. Thus, the half pulse widths Wx and Wy of the first and second control signals Xn and Yn are set in advance as follows;

$$Wx = T \times (5/4) \times 2 = 1/(2.fsc) \simeq 140 \text{ nsec}$$

$$Wy = T \times 4 \times 2 = 8/(5.fsc) \simeq 450 \text{ nsec};$$

The frequency fn of the first and second control signals Xn and Yn is set to the subcarrier frequency. That is;

$$fn = 1/T \simeq 3.58 \text{ MHz};$$

The pulse amplitudes of the first and second control signals Xn and Yn have a relation as follows;

$$Xn + Yn = 1;$$

Figure 10:
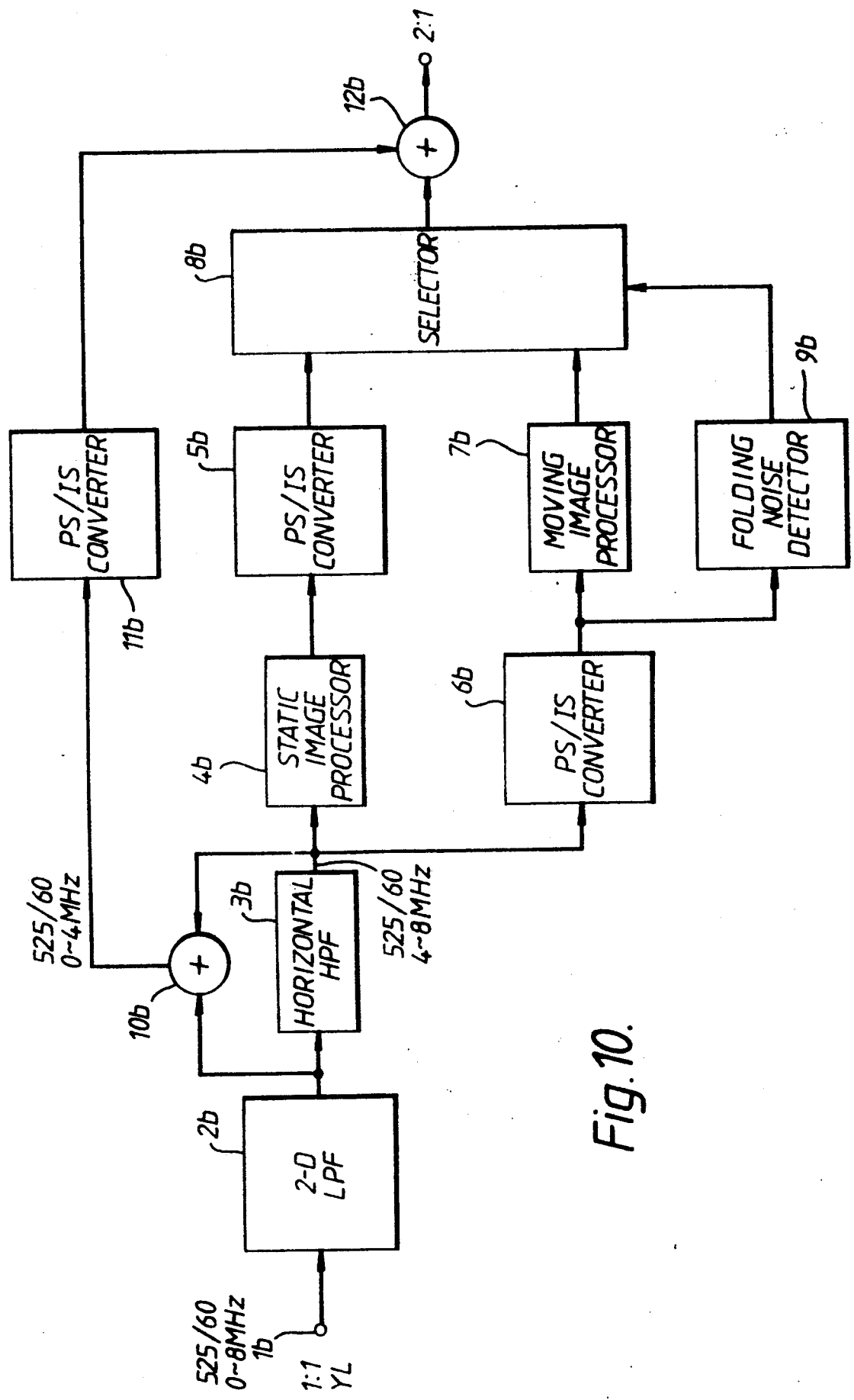
FIG. 10 is a block diagram showing the motion adapted processor 18 of FIG. 3.

Referring now to FIG. 10, a detail of a circuit comprising the motion adapted processor 18 will be described. In FIG. 10, an input terminal 1b receives the low frequency luminance signal YL output from the luminance signal separator 15 (see FIG. 3). The low frequency luminance signal YL is applied to a two-dimensional low pass filter (referred to as 2-D LPF hereafter) 2b. The 2-D LPF 2b has prescribed horizontal and vertical cut off frequencies so that a two-dimensional high frequency component of the low frequency luminance signal YL, as shown in FIG. 6(a) by the hatching region, is cut off or eliminated. It is known that such a region of the two-dimensional high frequency component has very low sensitivity for human eyes. Thus, the elimination of the region does not cause a serious fall of image quality.

An output of the 2-D LPF 2b is applied to a horizontal high pass filter 3b. The horizontal high pass filter 3b limits the frequency band of the low frequency luminance signal YL to 4–8 MHz. The low frequency luminance signal YL with the frequency band 4–8 MHz is provided for a motion adapted processing, as described below.

The low frequency luminance signal YL with the frequency band 4–8 MHz is applied to a static image processor 4b and a first progressive scan/interlace scan converter (referred to as a PS/IS converter hereafter) 6b.

Figure 11:
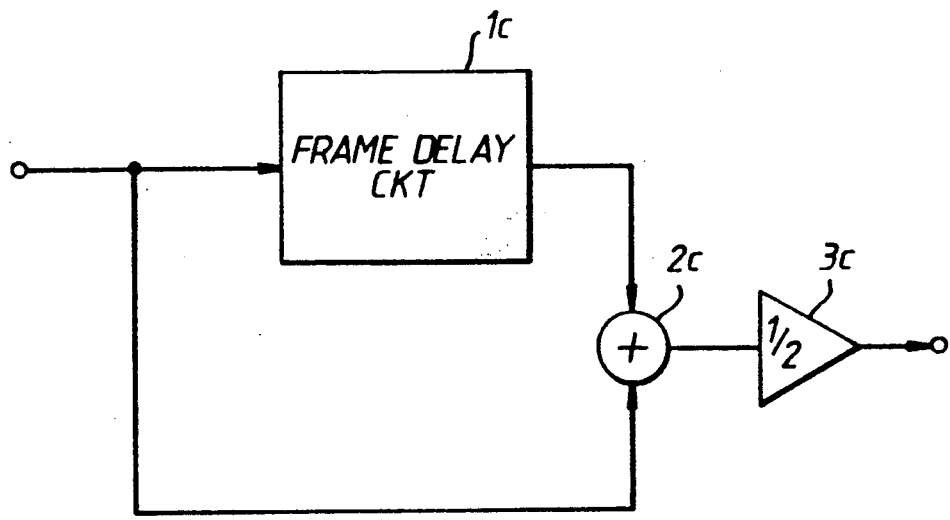
FIG. 11 is a block diagram showing the static image processor 4b of FIG. 10.

The static image processor 4b has a conventional circuit construction, as shown in FIG. 11. In FIG. 11, the low frequency luminance signal YL with the frequency band 4–8 MHz is applied to an adder 2c through a frame delay circuit 1c. Further, the low frequency luminance signal YL with the frequency band 4–8 MHz is directly applied to the adder 2c. The frame delay circuit 1c delays the low frequency luminance signal YL with the frequency band 4–8 MHz by one frame period (1/60 sec). The low frequency luminance signal YL with the frequency band 4–8 MHz and its delayed signal are added together in the adder 2c. The combined signal output from the adder has its amplitude suppressed by ½ in a ½ coefficient circuit 3c. Thus, a mean value signal of two frames of the low frequency luminance signal YL with the frequency band 4–8 MHz is obtained by the static image processor 4b. In this case, the frames have a period of 1/30 sec between them.

Figure 12:
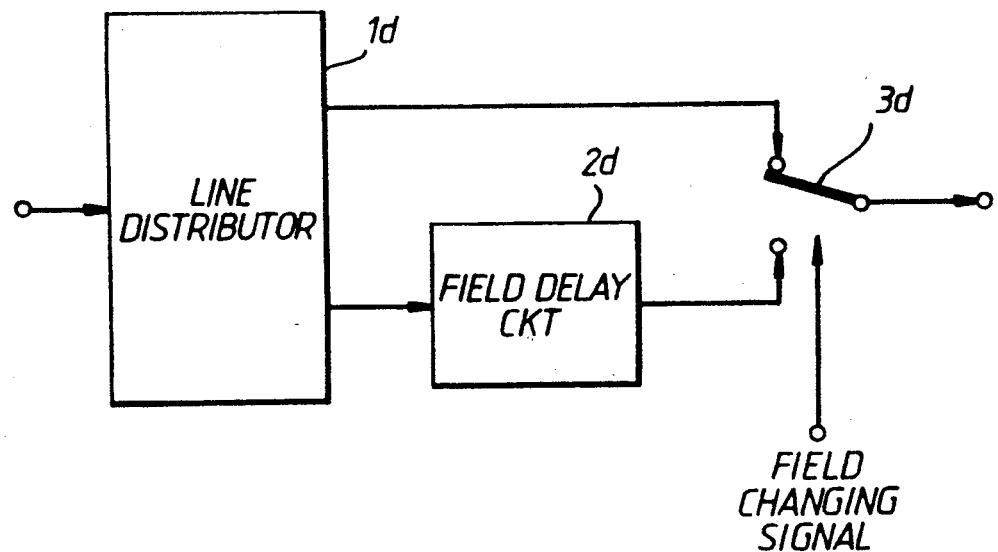
FIG. 12 is a block diagram showing the second PS/IS converter 5b of FIG. 10.

The mean value signal of the low frequency luminance signal YL with the frequency band 4–8 MHz is applied to a second PS/IS converter 5b. Thus, the mean value signal is converted from the progressive scan signal to the interlace scan signal. The second PS/IS converter 5b has a conventional circuit construction, as shown in FIG. 12. In FIG. 12, the mean value signal is applied to a line distributor 1d. The line distributor 1d separates one frame of the mean value signal of the progressive scan low frequency luminance signal YL with the frequency band 4–8 MHz to an odd line field and an even line field. One of the fields, e.g., the odd line field is distributed to its first output terminal. The other field, e.g., the even line field is distributed to its second output terminal. The odd line field is directly applied to a first input terminal of a field changer 3d. The even line field is applied to a second input terminal of the field changer 3d through a field delay circuit 2d. An output terminal of the field changer 3d is alternately coupled to the first and second input terminals in response to a prescribed field change frequency. Thus, the interlace scan signal of the low frequency luminance signal YL is output from the second PS/IS converter 5b. The interlace scan signal of the low frequency luminance signal YL does not include a moving image component, since both the odd and even line fields are originated to the same frame signal of the progressive scan signal. Thus, such a folding noise with a vertical high frequency component, which occurs in the progressive scan to interlace scan conversion for the moving image signal, is not included in the interlace scan signal output from the second PS/IS converter 5b. This means that a crosstalk of the folding noise into the region of the two-dimensional high frequency component of the low frequency luminance signal YL, as shown in FIG. 6(a), is prevented. The interlace scan signal of the low frequency luminance signal YL output from the second PS/IS converter 5b is applied to a selector 8b. The selector 8b selectively outputs either one of the interlace scan signal of the low frequency luminance signal YL output from the second PS/IS converter 5b and another interlace scan signal of the low frequency luminance signal YL, as described later. The selected output of the selector 8b is applied to an adder 12b.

The first PS/IS converter 6b has a similar circuit construction as the second PS/IS converter 5b, as shown in FIG. 12. However, the line distributer 1d selectively eliminates the odd or even line field in every frame. For example, the odd line field of one frame is distributed to the first output terminal, but the even line field of the same frame is eliminated. The even line field of the next frame is distributed to the second output terminal, but the odd line field of the same frame is eliminated. Thus, the moving image component is maintained in the interlace scan conversion signal output from the first PS/IS converter 6b for two continuous frames.

The interlace scan conversion signal output from the first PS/IS converter 6b is applied to the selector 8b through a moving image processor 7b. The moving image processor 7b carries out a prescribed moving image processing on the interlace scan conversion signal output from the first PS/IS converter 6b. The selector 8b selectively outputs any one of both the interlace scan signals output from the first and second PS/IS converter 6b and 5b in response to a selection control signal.

The selection control signal is generated by a folding noise detector 9b coupled to the first PS/IS converter 6b. The folding noise detector 9b detects the folding noise in the interlace scan signal output from the first PS/IS converter 6b. The folding noise occurs in moving images, but not in static images. Thus, the folding noise detector 9b detects the folding noise when moving images are input to the circuit. The folding noise detector 9b generates the selection control signal when the detected folding noise exceeds a prescribed level. The selector 8b selectively outputs the interlace scan signal output from the second PS/IS converter 5b when the selection control signal is supplied from the folding noise detector 9b. Otherwise, the selector 8b selectively outputs the interlace scan signal output from the first PS/IS converter 6b. Details of the circuit constructions of the moving image processor 7b and the folding noise detector 9b will be described later.

The low frequency luminance signal YL output from the 2-D LPF 2b is also applied to a subtractor 10b (see FIG. 10). The subtractor 10b carries out a subtraction between the low frequency luminance signal YL and the other low frequency luminance signal YL with the frequency band 4–8 MHz. Thus, a low frequency band 0–4 MHz of the low frequency luminance signal YL is output from the subtractor 10b. In other words, the low frequency band 0–4 MHz of the low frequency luminance signal YL is obtained by the subtraction between the input and the out signals of the 2-D HPF 3b.

The low frequency band 0–4 MHz of the low frequency luminance signal YL is also applied to the adder 12b through a third PS/IS converter 11b. The third PS/IS converter 11b converts the low frequency luminance signal YL with the frequency band 0–4 MHz output from the subtractor 10b to the interlace scan signal by the same manner as the second PS/IS converter 11b. Thus, the low frequency luminance signal YL with the frequency band 0–4 MHz output from the subtractor 10b is combined with the other low frequency luminance signal YL with the frequency band 4–8 MHz output from the selector 8b in the adder 12b.

Now, the advantage of the motion adapted processor 18 will be described. It is known that folding noise occurs easily with respect to moving images. The folding noise deteriorates images reproduced by television receivers. In a conventional system, any one of odd and even line fields is used twice as odd and even line fields for constructing one interlace scan frame for preventing the occurrence of the folding noise. Thus, the image produced in this case can be treated as a static image which is not associated with the folding noise. However, such a conventional system has a drawback that the reproduced image shows unnatural motion.

Such a drawback of the conventional system will be described in reference to FIG. 13. FIGS. 13(a) and 13(b) both diagramatically show a rightward motion of an image such as a rectangular image at a constant speed. FIG. 13(a) corresponds to the motion in an original signal, e.g., a signal obtained by color cameras. References n, n+1, n+2 and n+3 in the drawings represent continuous fields of the image. FIG. 13(b) corresponds to a motion of image reproduced by the conventional system, i.e., a motion of image reproduced by using twice the same field for one frame. As can be easily understood from FIG. 13(b), the motion of the image is jerky. That is, the "n+1" field halts the same position as the "n" field, in spite of the original image moving as shown in FIG. 13(a). On the other hand, the "n+2" field moves a relatively long distance from the position of the "n+1" field. The "n+3" field again halts the same position as the "n+2" field. Such a motion of image obtained by the conventional system is sensed by human eyes as a jerky motion or a motion jerkiness. It is also known that the motion jerkiness gives a serious unnaturality for human eyes, as reported by Makoto Miyahara in "Analysis of Perception of Motion in Television Signals and Its Application to Bandwidth Compression," NHK Technical Research Laboratories Report, 1975, Vol. 27, No. 4, pp. 141–171.

Now the embodiment of the color television system according to the present invention will be described, with respect to moving images. In this embodiment, the high frequency band 4–8 MHz of the low frequency luminance signal YL is eliminated from the odd and even line fields constructing the same fields, i.e., the "n" and "n+1" fields. This carries out a local thinned-out transmission of fields for a moving image signal. It is known that such a moving image signal causes a 30 Hz flicker at horizontal edges of images.

FIG. 14(a) shows a motion of an image reproduced by the embodiment, when a motion of an image, as shown in FIG. 13(a), occurs in the original signal. Broken line areas in the drawing correspond to portions referred to as an uncovered background image, which is eliminated by the local thinned-out transmission of fields. The uncovered background image is less important for the image quality so that the uncovered background image scarcely deteriorates a naturality of the motion of image for human eyes.

FIG. 14(b) illustrates a reproduction of images carried out in television receivers for the moving images transmitted by the embodiment. In the drawing, dotted line areas correspond to the uncovered background images in FIG. 13(a). With respect to the reproduction of the "n" field, the image illustrated by the solid line can be reproduced by both the "n" and "n+1" fields. The uncovered background images illustrated by the dotted line can be reproduced by only the "n" field. With respect to the reproduction of the "n+1" field, the image illustrated by the solid line can be reproduced by both the "n" and "n+1" fields. The uncovered background images illustrated by the dotted line can be reproduced by only the "n+1" field.

Figure 15:
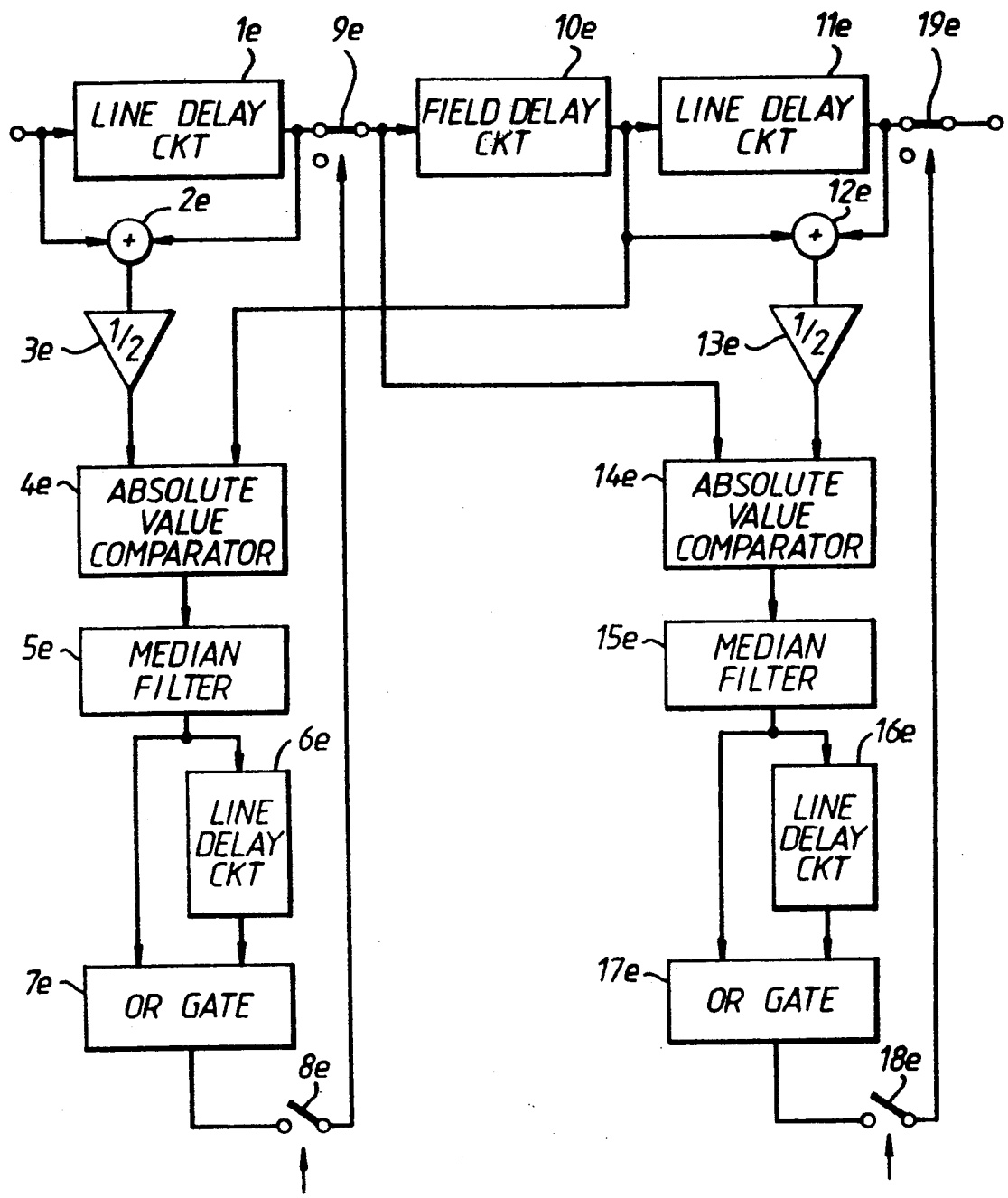
FIG. 15 is a block diagram showing the moving image processor 7b of FIG. 10.

Referring now to FIG. 15, a detail of a circuit comprising the moving image processor 7b will be described. In FIG. 15, the interlace scan signal output from the first PS/IS converter 6b is applied to a first one horizontal line delay circuit (referred to as 1H delay circuit hereafter) 1e and a first adder 2e. The first adder 2e adds the input signal, i.e, the interlace scan signal with its 1H delayed signal output from the first 1H delay circuit 1e. The combined signal output from the first adder 2e is applied to a first absolute value comparator 4e through a first ½ coefficient circuit 3e. The first ½ coefficient circuit 3e reduces the amplitude of the combined signal. Thus, the signal output from the first ½ coefficient circuit 3e represents a mean value of two continuous horizontal line signals. Thus, the signal will be referred to as a line average signal.

The first absolute value comparator 4e compares absolute values of the line average signal and a one field delay signal output from a one field delay circuit (referred to as the 262H delay circuit hereafter) 10e. The 262H delay circuit 10e is coupled to the first 1H delay circuit 1e through a first field thinning switch 9e. The first absolute value comparator 4e judges which is significant in both signals, i.e., the line average signal supplied from the first ½ coefficient circuit 3e and the one field delay signal (the 262H delay signal) supplied from the 262H delay circuit 10e. The judged singal is applied to a first median filter 5e. The first median filter 5e removes isolated noise components from the judged signal. The judged signal output from the first medial filter 5e is applied to a first OR gate 7e. Further, the judged signal is applied to the first OR gate 7e through a second 1H delay circuit 6e. The first OR gate 7e combines the judged signal and its 1H delay signal. Thus, a judged signal continuing 2H period is obtained. The 2H period continuing judged signal is applied to a control terminal of the first field thinning switch 9e through a first field change switch 8e.

Now, the following description will be made by assuming that the 262H delay signal is more significant than the mean value signal of the two continuous horizontal line signals. In this case, the 2H period continuing judged signal output from the first OR gate 7e turns OFF the first field thinning switch 9e. That is, the above circuit carries out a thinning operation of the second field of the interlace scan frame. According to the thinning operation, uncovered background images of the second fields, i.e., the dotted line region of the "n+1" field, as shown in FIG. 14(a), is eliminated.

In the same manner as the above, another thinning operation of the first field, i.e., the "n" field is carried out. The 262H delay signal output from the 262H delay circuit 10e is applied to a third 1H delay circuit 11e and a second adder 12e. The second adder 12e adds the 262H delay signal with its 1H delayed signal output from the third 1H delay circuit 11e. The combined signal output from the second adder 12e is applied to a second absolute value comparator 14e through a second ½ coefficient circuit 13e. The second ½ coefficient circuit 13e reduces the amplitude of the combined signal. Thus, the signal output from the second ½ coefficient circuit 13e also represents a mean value of two continuous horizontal line signals, i.e., a line average signal.

The second absolute value comparator 14e compares absolute values of the line average signal and the 1H delay signal output from the first 1H delay circuit 1e. The second absolute value comparator 14e judges which is significant in both signals, i.e., the line average signal supplied from the second ½ coefficient circuit 13e and the 1H delay signal supplied from the first 1H delay circuit 1e. The judged signal is applied to a median filter 15e. The median filter 15e removes isolated noise components from the judged signal. The judged signal output from the second median filter 15e is applied to a second OR gate 17e. Further, the judged signal is applied to the second OR gate 17e through a fourth 1H delay circuit 16e. The second OR gate 17e combines the judged signal and its 1H delay signal. Thus, a judged signal continuing 2H period is obtained. The 2H continuing judged signal is applied to a control terminal of a second field thinning switch 19e through a second field change switch 18e.

Now, a following description will be made by assuming that the 1H delay signal output from the first 1H delay circuit 1e is more significant than the mean value signal of the two continuous horizontal line signals. In this case, the 2H period continuing judged signal output from the second OR gate 17e turns OFF the second field thinning switch 19e. That is, the above circuit carries out a thinning operation of the first field of the interlace scan frame. According to the thinning operation, uncovered background images of the first fields, i.e., the dotted line region of the "n" field, as shown in FIG. 14(a), is eliminated.

The first and second field change switches 8e and 18e are turned ON in a one field period in which the first and second fields appear on the output and the input of the 262H delay circuit 10e, respectively. Thus, the moving image processing as described above is carried out for every frame.

According to the above operation, a luminance signal Y included in two continuing lines of one of first and second fields constituting the same frame is eliminated when a significant information is included in the other of the two fields. Thus, a field thinning operation for the luminance signal Y is locally carried out. Such a luminance signal Y included in the less significant field is thinned out for the moving image region. Thus, the unnaturality of moving images is prevented.

Figure 16:
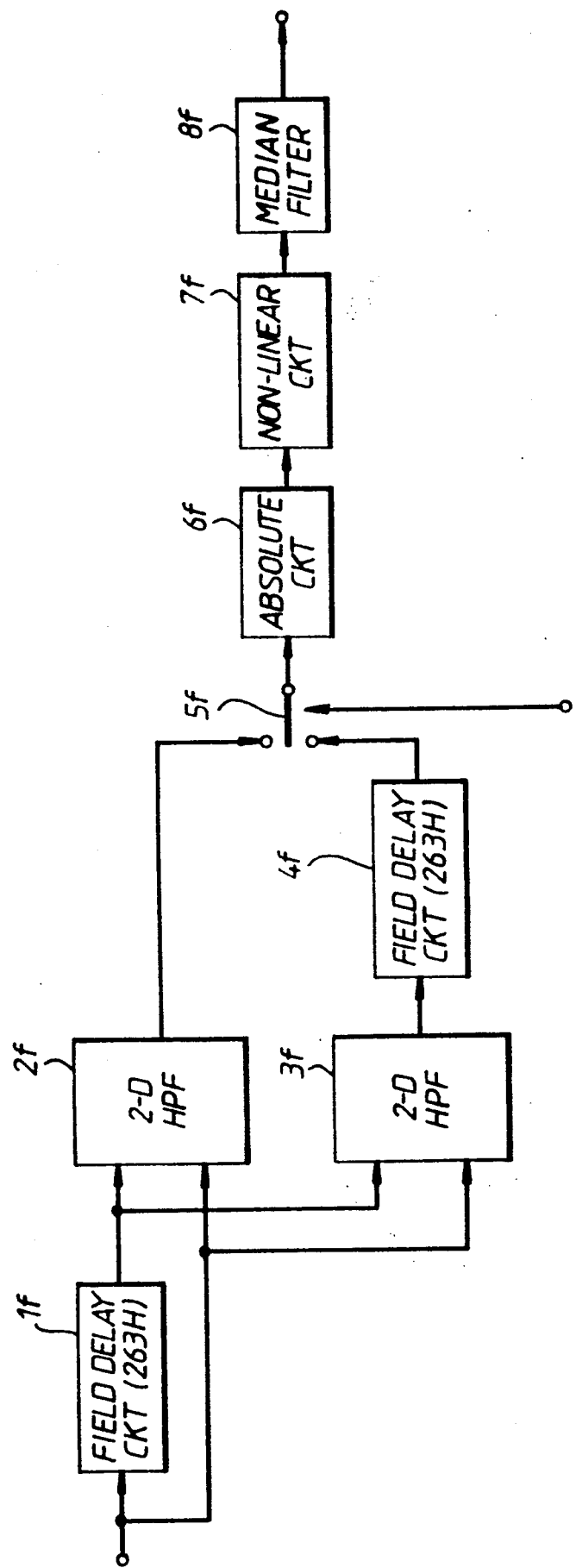
FIG. 16 is a block diagram showing the folding noise detector 9b of FIG. 10.

Referring now to FIG. 16, a detail of a circuit comprising the folding noise detector 9b will be described. In FIG. 16, the interlace scan signal output from the first PS/IS converter 6b (see FIG. 10) is directly applied to first and second two-dimensional high pass filters (referred to as 2-D HPF is hereafter) 2f and 3f. Further, the interlace scan signal is applied to the first and second 2-D HPFs 2f and 3f through a one field delay circuit (referred to as a 263H delay circuit) 1f. Each of the first and second 2-D HPFs 2f and 3f has a two dimensional frequency band pass characteristic corresponding to the hatching rectangles, as shown in FIGS. 6(a) and 6(b).

From interlace scan signal output from the first PS/IS converter 6b a high frequency component corresponding to the hatching rectangles is removed by the 2-D LPF 2b (see FIG. 10). However, a folding noise corresponding to the hatching rectangle is produced during the PS/IS conversion carried out by the first PS/IS converter 6b, as described before. The folding noise is detected by the first and second 2-D HPFS 2f and 3f.

As described above, the folding noise detector 9b comprises two 2-D HPFS, i.e., the first and second 2-D HPFS 2f and 3f. This is because the interlace scan signal output from the first PS/IS converter 6b comprises two fields, i.e., first and second fields for one frame. The second field is shifted from the first field by 1H period. Thus, the first and second 2-D HPFS 2f and 3f are provided for processing the first and second fields, respectively. For example, the first 2-D HPFS 2f is directly coupled to a first input terminal of a field change switch 5f. On the other hand, the second 2-D HPF 3f is coupled to a second input terminal of the field change switch 5f through a one field delay circuit (referred to as a 263H delay circuit) 4f. Thus, the first 2-D HPF 2f detects the folding noise from the first field. On the other hand, the second 2-D HPF 3f detects the folding noise from the second field.

The field change switch 5f is controlled by a control signal synchronized with the changing between the first and second fields. Thus, the folding noise detected by the first and second 2-D HPFS 2f and 3f are alternately output from the field change switch 5f. The signal, i.e., the folding noise output from the field change switch 5f has the interlace scan form. The folding noise is applied to an absolute value processor 6f. The absolute value processor 6f takes an absolute value of the folding noise. The absolute value of the folding noise is applied to a median filter 8f through a non-linear circuit 7f. The non-linear circuit 7f converts the absolute value of the folding noise to a prescribed folding noise detection signal. The median filter 8e removes isolated noise components from the folding noise detection signal. Then, the folding noise detection signal is applied to the control terminal of the selector 8b (see FIG. 10).

Figure 17:
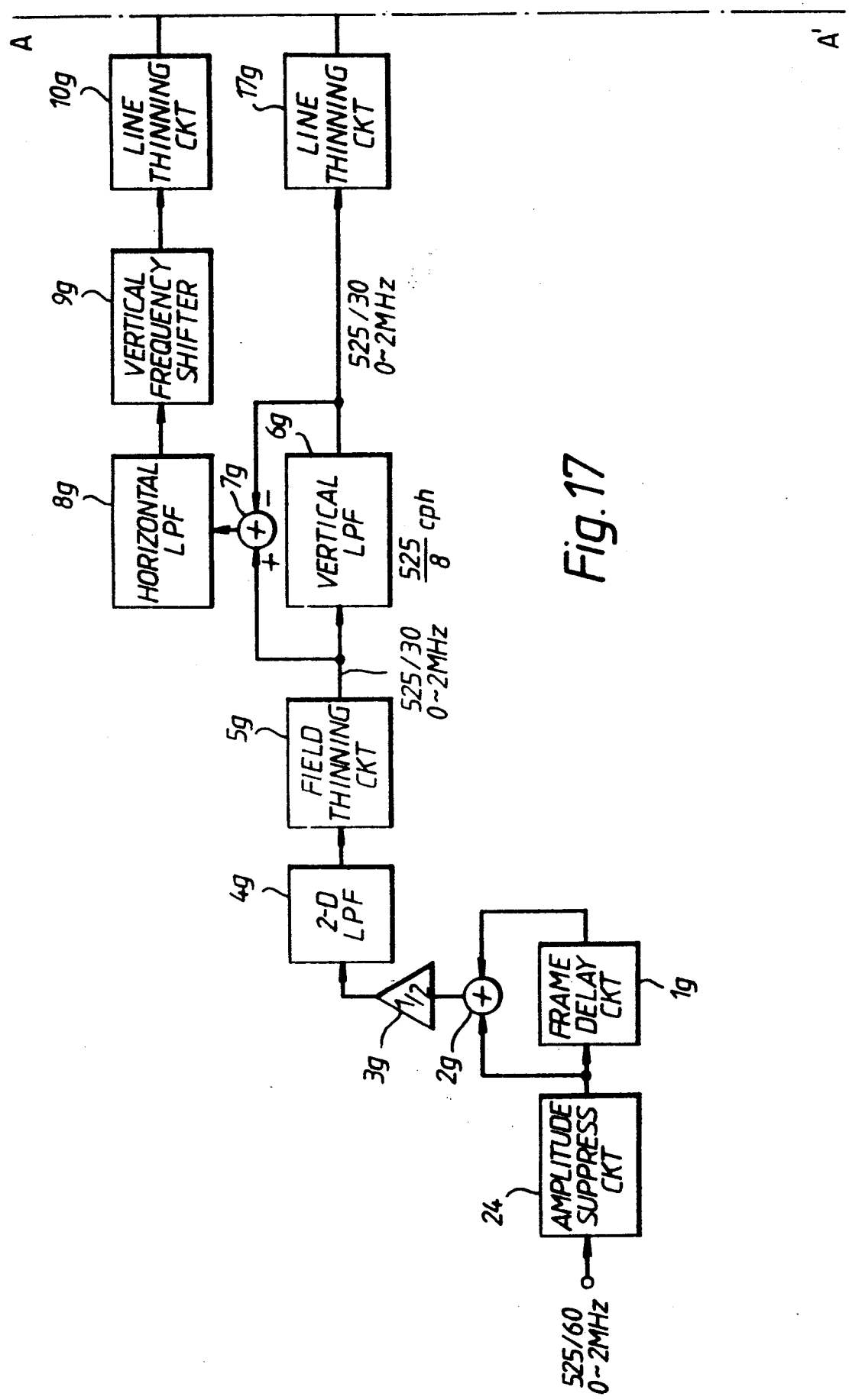
FIG. 17 is a block diagram showing the whole circuit containing the BPF 23, the amplitude suppressing circuit 24 and the side panel signal encoder 25 of FIG. 3.
Figure 17:
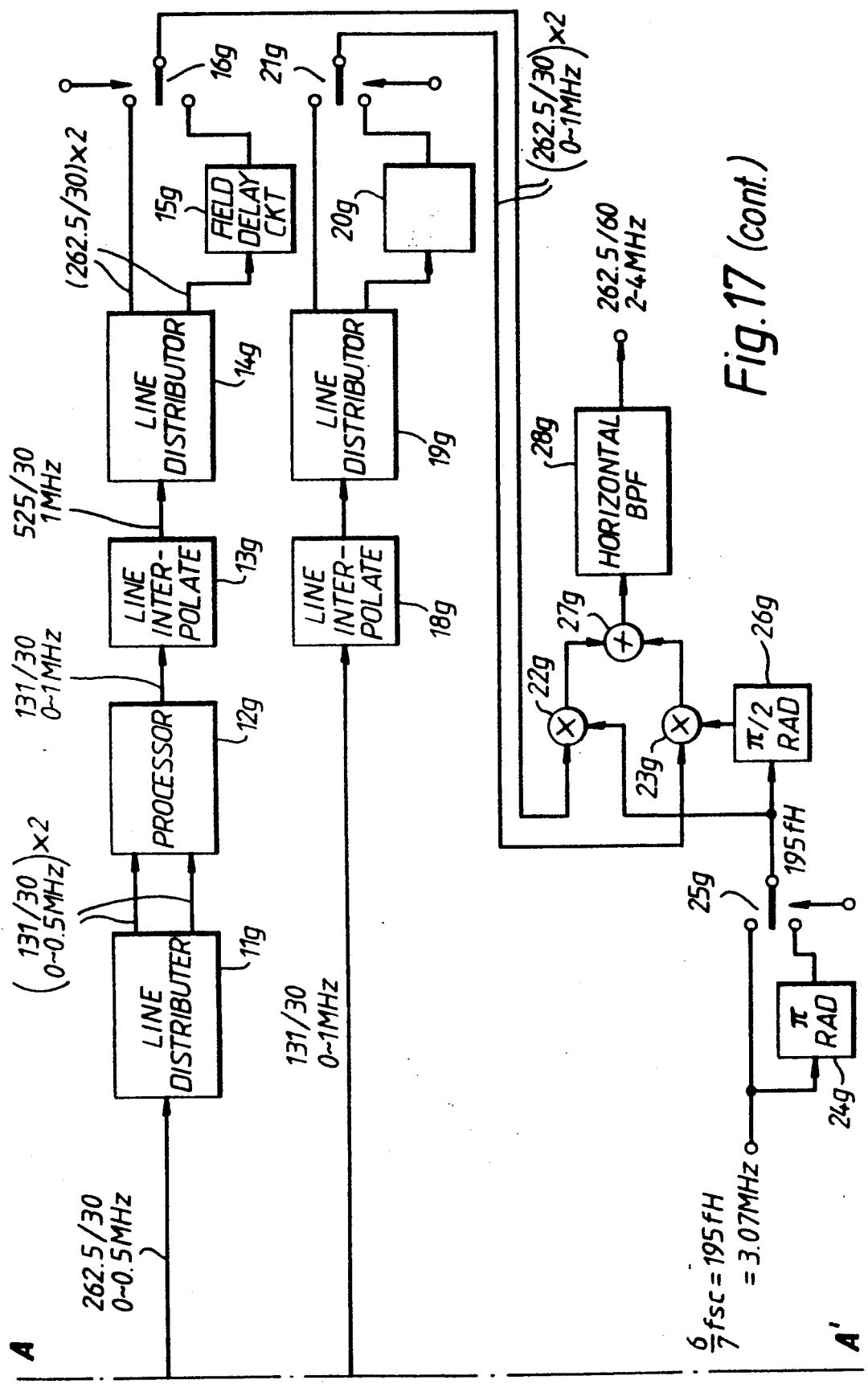

Referring now to FIG. 17, a detail of a circuit comprising the band pass filter 23, the amplitude suppressing circuit 24 and the side panel signal encoder 25 is illustrated. In FIG. 17, the band pass filter 23 and the side panel signal encoder 25 form a perfect whole. The amplitude suppressing circuit 24 may be located in any position in the circuit of FIG. 17. In this embodiment, however, the amplitude suppressing circuit 24 is located in the position nearest to an input terminal of the whole circuit, for the sake of convenience.

The input terminal of the whole circuit receives the time-division multiplex signal output from the time-division multiplex circuit 22. The time-division multiplex signal includes the side panel signal Ss. The side panel signal Ss is converted to the prescribed two-dimensional frequency band signal corresponding to the hatching rectangles, as shown in FIGS. 6(a) and 6(b). Then, a maximum information capacity of the time-division multiplex signal per 1/30 sec is given as follows;

525/4 cph (vertical direction) × 1 MHz (horizontal direction)

The circuit, as shown in FIG. 17, converts an input signal with the frame frequency of 60 Hz to an output signal with the frame frequency of 30 Hz by a frame thinning circuit 5g, as described later. To cope with the frame thinning operation carry out by the circuit of the transmitter, wide-screen television receivers carries out a frame interpolation.

The circuit of FIG. 17 is designed to make the frame interpolation in the wide-screen television receivers easy or sure. That is, the circuit comprises a one frame delay circuit 1g, an adder 2g and a ½ coefficient circuit 3g. The time-division multiplex signal output from the time-division multiplex circuit 22 is applied to the one frame delay circuit 1g and the adder 2e. The adder 2e adds the time-division multiplex signal and its one frame delayed signal. The combined signal output from the adder 2g is applied to the ½ coefficient circuit 3g. The first ½ coefficient circuit 3g reduces the amplitude of the combined signal to ½ times. Thus, the signal output from the ½ coefficient circuit 3g represents a mean value of two continuous frame signals. Thus, the signal will be referred to as a frame average signal.

Figures 18A, 18B, 18C, 18D:
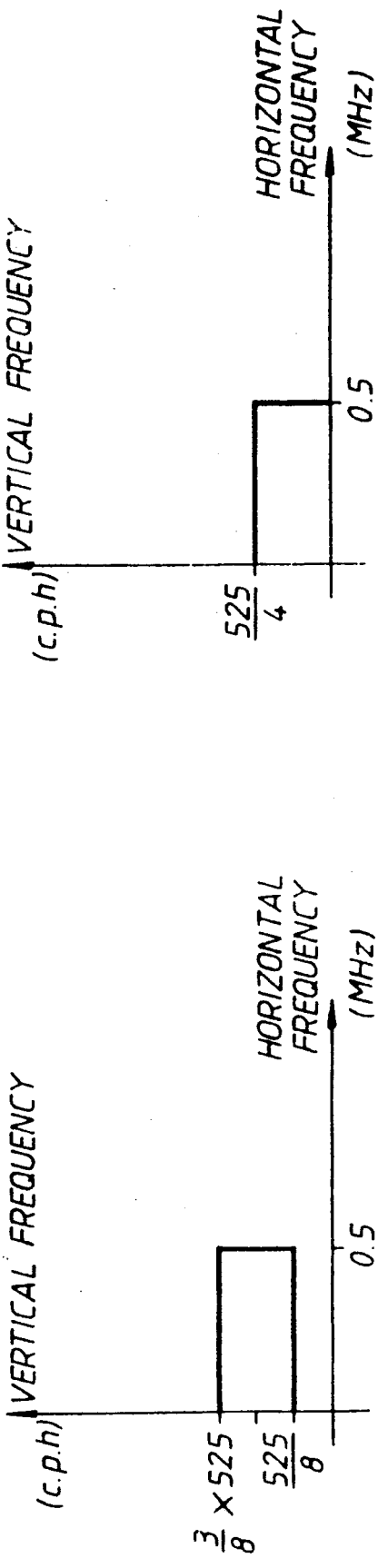
FIGS. 18 and 19 are graphs for illustrating the operation of the circuit of FIG. 17.

The frame average signal is applied to a 2-D LPF 4g. The 2-D LPF 4g has prescribed horizontal and vertical cut off frequencies so that the two-dimensional frequency spectrum of the frame average signal is limited to a region, as shown in FIG. 18(a). The information capacity of the region is equivalent to the capacity as described above, i.e.,; 525/4 cph × 1 MHz.

The output of the 2-D LPF 4g is applied to a field thinning circuit 5g. The field thinning circuit 5g thins out one field for every frame. Thus, the frame frequency of a signal output from the field thinning circuit 5g, i.e., the frame frequency of the side panel signal Ss is converted to 30 Hz. The side panel signal Ss output from the field thinning circuit 5g also has the same two-dimensional frequency spectrum as the frame average signal, as shown in FIG. 18(a).

The side panel signal Ss output from the field thinning circuit 5g is applied to a vertical LPF 6g. The vertical LPF 6g again limits the frequency spectrum, as shown in FIG. 18(a), of the side panel signal Ss to a frequency spectrum, as shown in FIG. 18(b). The output signal with the frequency spectrum, as shown in FIG. 18(b), and the input signal with the frequency spectrum, as shown in FIG. 18(a) are applied to a subtractor 7g. The subtractor 7g subtracts the signal with the frequency spectrum, as shown in FIG. 18(b), from the signal with the frequency spectrum, as shown in FIG. 18(a). The subtraction signal output from the subtractor 7g is applied to a horizontal LPF 8g. Thus, a signal with a frequency spectrum, as shown in FIG. 18(c), is obtained from the series circuit of the subtractor 7g and the horizontal LPF 8g. The signal with the frequency spectrum, as shown in FIG. 18(c), is applied to a vertical frequency shifter 9g. The vertical frequency shifter 9g shifts the vertical frequency of the signal, i.e., the side panel signal Ss output from the horizontal LPF 8g by a vertical frequency corresponding to four lines. Thus, a signal with a frequency spectrum, as shown in FIG. 18(d), is obtained from the vertical frequency shifter 9g.

The side panel signal Ss output from the vertical frequency shifter 9g is applied to a first line thinning circuit 10g. The first line thinning circuit 10g carries out a prescribed line thinning operation for the side panel signal Ss output from the vertical frequency shifter 9g. Thus, the side panel signal Ss is converted to a signal with 262.5 scanning lines. The horizontal period of the converted signal is also expanded to 64 μsec. The signal also has the frame frequency 30 Hz and a frequency band 0–0.5 MHz.

The signal output from the first line thinning circuit 10g is applied to a first line distributor 11g. The first line distributor 11g alternately distributes the 262.5 scanning lines to its two output terminals. Thus, each of the output terminals outputs a signal with 131 scanning lines. The signals each including the 131 scanning lines are applied to a signal processor 12g. The signal processor 11g compresses the time of the signals to the ½ time. Further, the signal processor 12g multiplexes the time compressed signals with each other by the time-division multiplexing. Thus, the signal processor 12g outputs a time-division multiplexed signal with 131 scanning lines, the frame frequency of 30 Hz and the frequency band of 0–1 MHz. Further, each of the 131 scanning lines of the multiplexed signal comprises two horizontal lines which are parallelly supplied from the line distributer 11g and coupled in series with each other.

The time-division multiplexed signal is applied to a first line interpolation circuit 13g. The first line interpolation circuit 13g converts the time-division multiplexed signal to a signal with 525 scanning lines. In the first line interpolation circuit 13g, the input signal, i.e., an amplitude of the time-division multiplexed signal is suppressed to ¼ times. Then, the amplitude suppressed 131 scanning lines are divided to 525 scanning lines. The 525 scanning lines signal is output from the first line interpolation circuit 13g for a period of 1/60 sec in every 1/30 sec.

The signal with 525 scanning lines is applied to a line distributor 14g. The line distributor 14g distributes the 525 scanning lines to two groups comprising an odd line field and an even line group. One of the fields, e.g., the odd line field is directly applied to a first input terminal of a field changer 16g. The other field, e.g., the even line field is applied to the second input terminal of the field changer 16g through a one field delay circuit 15g. An output terminal of the field changer 16g is alternately coupled to the first and second input terminals in response to a prescribed field change frequency. Thus, the side panel signal Ss with the progressive scan version is converted to a signal with the interlace scan version. Thus, the interlace scan side panel signal Ss has 262.5 scanning lines, a field frequency of 60 Hz and a frequency band of 0-1 MHz.

The signal output from the vertical LPF 6g, i.e., the signal with the frequency spectrum, as shown in FIG. 18(b), is also applied to a second line thinning circuit 17g. The second line thinning circuit 17g carries out a prescribed line thinning operation for the side panel signal Ss output from the vertical LPF 6g. Thus, the side panel signal Ss is converted to a signal with 131 scanning lines. Further, the second line thinning circuit 17g expands the time axis length of the signal thinned to 131 scanning lines to 2 times. Thus, the signal output from the second line thinning circuit 17g has 131 scanning lines, the frame frequency of 30 Hz and the frequency band of 0-1 MHz. An amplitude of the signal is reduced to $\frac{1}{4}$ times by the line interpolation circuit 18g, so that a total energy of the signal is not changed. The signal is then converted to a signal with 262.5 scanning lines, the field frequency of 60 Hz and the frequency band of 0-1 MHz, by a line distributor 19g, a field delay circuit 20g and a field changer 21g.

Signals output from the field changers 16g and 21g are orthogonally modulated by multipliers 22g and 23g. A frequency of a subcarrier for the orthogonal modulation is given as follows:

$$(6/7).\text{fsc} = 195.\text{fH} = 3.07 \text{MHz}$$

wherein fH is a horizontal synchronous frequency. A phase of the subcarrier is reversed for every field. The phase inversion is carried out by phase shifters 24g, 26g and a switch 25g coupled to a subcarrier source (not shown). The phase shifters 24g and 26g shift the phase of the subcarrier by $\pi$ radian and $\pi/2$ radian, respectively. The switch 25g is controlled by the field change frequency. The phase shifter 26g gives the modulated signals a phase difference of $\pi/2$ radian between them.

Figure 19B:
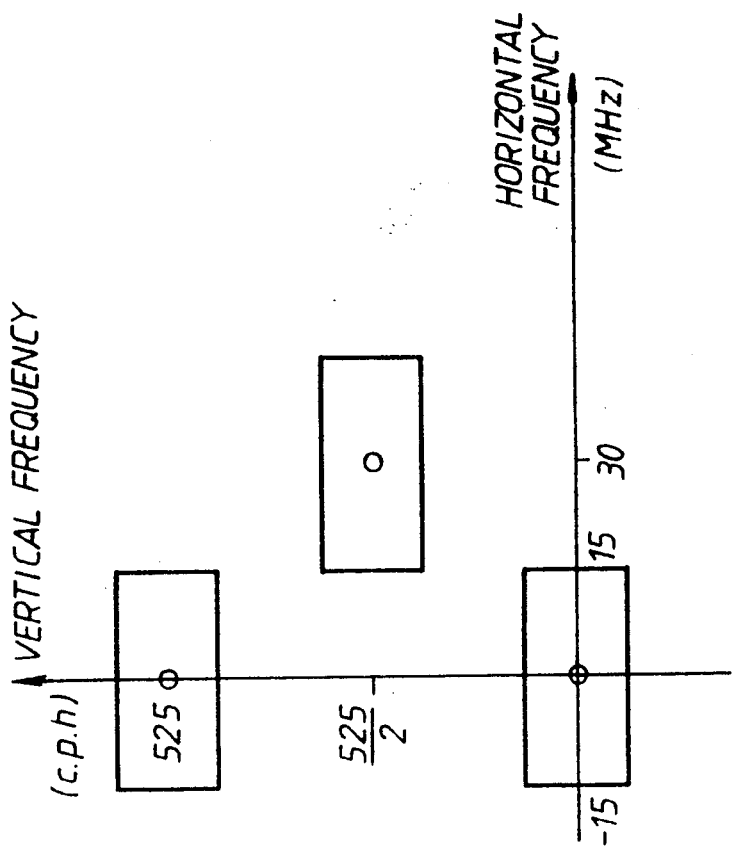
Figure 19A:
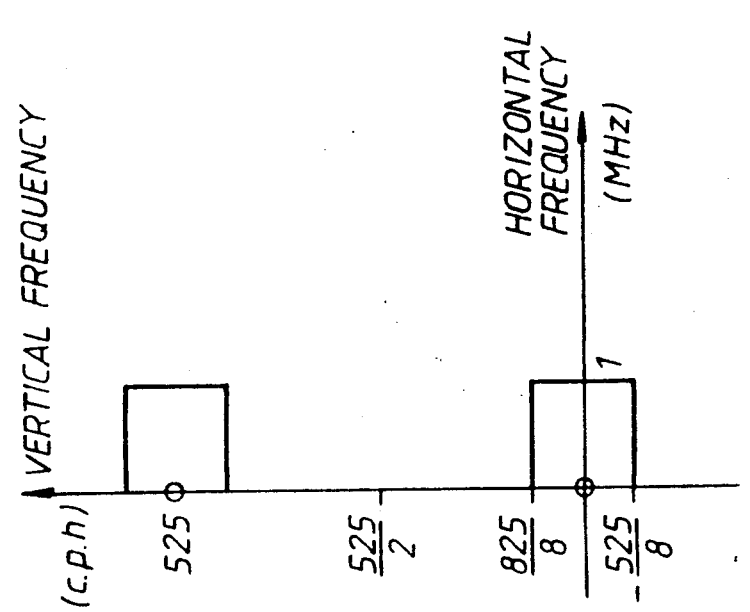

The orthogonally modulated signals output from the multipliers 22g and 23g are applied to an adder 27g. The adder 27g combines the orthogonally modulated signals together. The combined signal, i.e., the orthogonal modulation signal is applied to a horizontal BPF 28g. The horizontal BPF 28g limits the frequency band of the orthogonal modulation signal to 2-4 MHZ. Thus, a signal with the two-dimensional frequency spectrum, as shown by rectangles in FIG. 19, is output from the band pass filter 23 as shown in FIG. 3 with such a detailed circuit construction, as shown in FIG. 17.

Figure 20A:
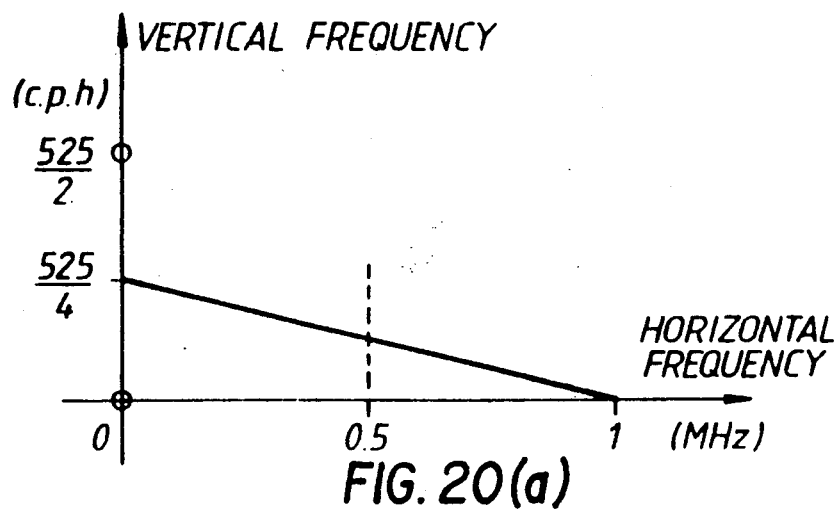
FIG. 20 is a graph for illustrating another band suppressing method.
Figure 20B:
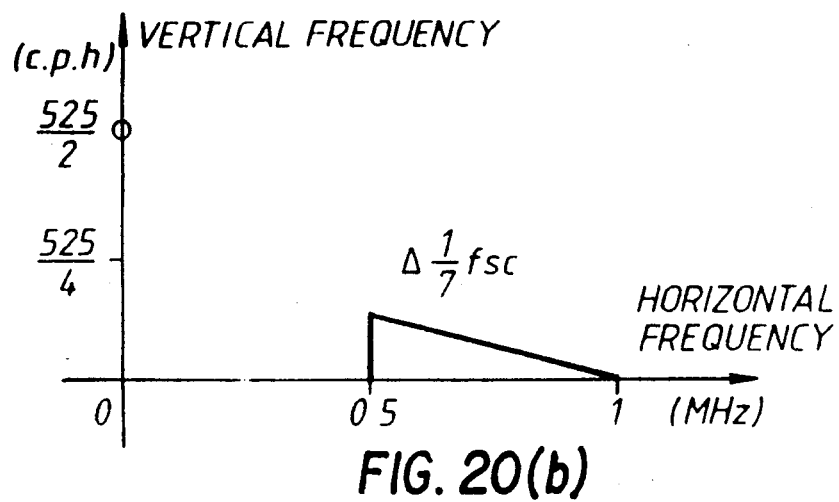
Figure 20C:
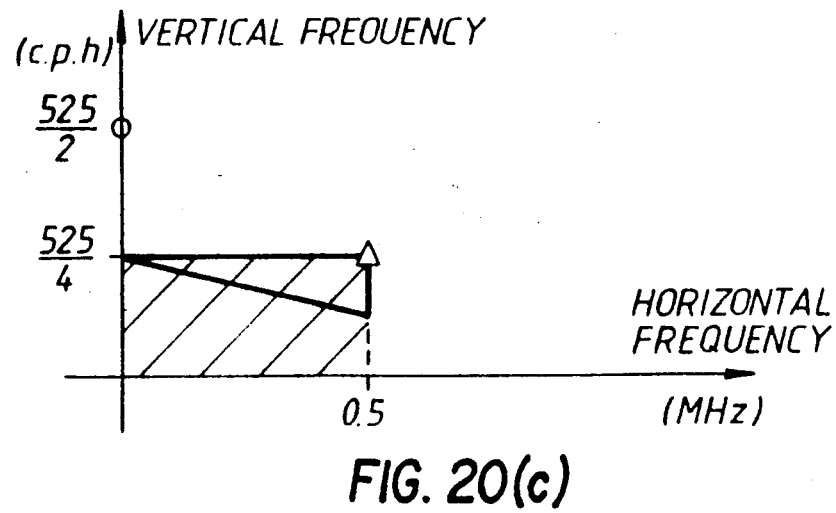

Referring now to FIG. 20, another version of the band suppression will be described. An oblique region over the vertical frequency of 525/4 cph and the horizontal frequency of 1 MHz is eliminated from the luminance signal Y in the two-dimensional frequency coordinate. Thus, the luminance signal with a frequency band, as shown in FIG. 20(a), is filtered out. A component with a frequency band 0.5-1 MHz, as shown in FIG. 20(b), is separated from the filtered luminance signal. The separated signal is folded by a subcarrier with the frequency of (1/7).fsc to a vertical high frequency region. Then, a band suppressed signal of the luminance signal Y, as shown in FIG. 20(c), is obtained. The band suppressed luminance signal Y is limited up to the vertical frequency of 525/4 cph and the horizontal frequency of 0.5 MHz.

According to the other band suppression, every field information of the television signal can be transmitted without carrying out a field thinning operation. Thus, in the television signal a naturality of moving images is not deteriorated. However, an image resolution of the television signal is decreased, since a relatively large portion of the luminance signal is eliminated, as shown in FIG. 20(a).

Figure 21:
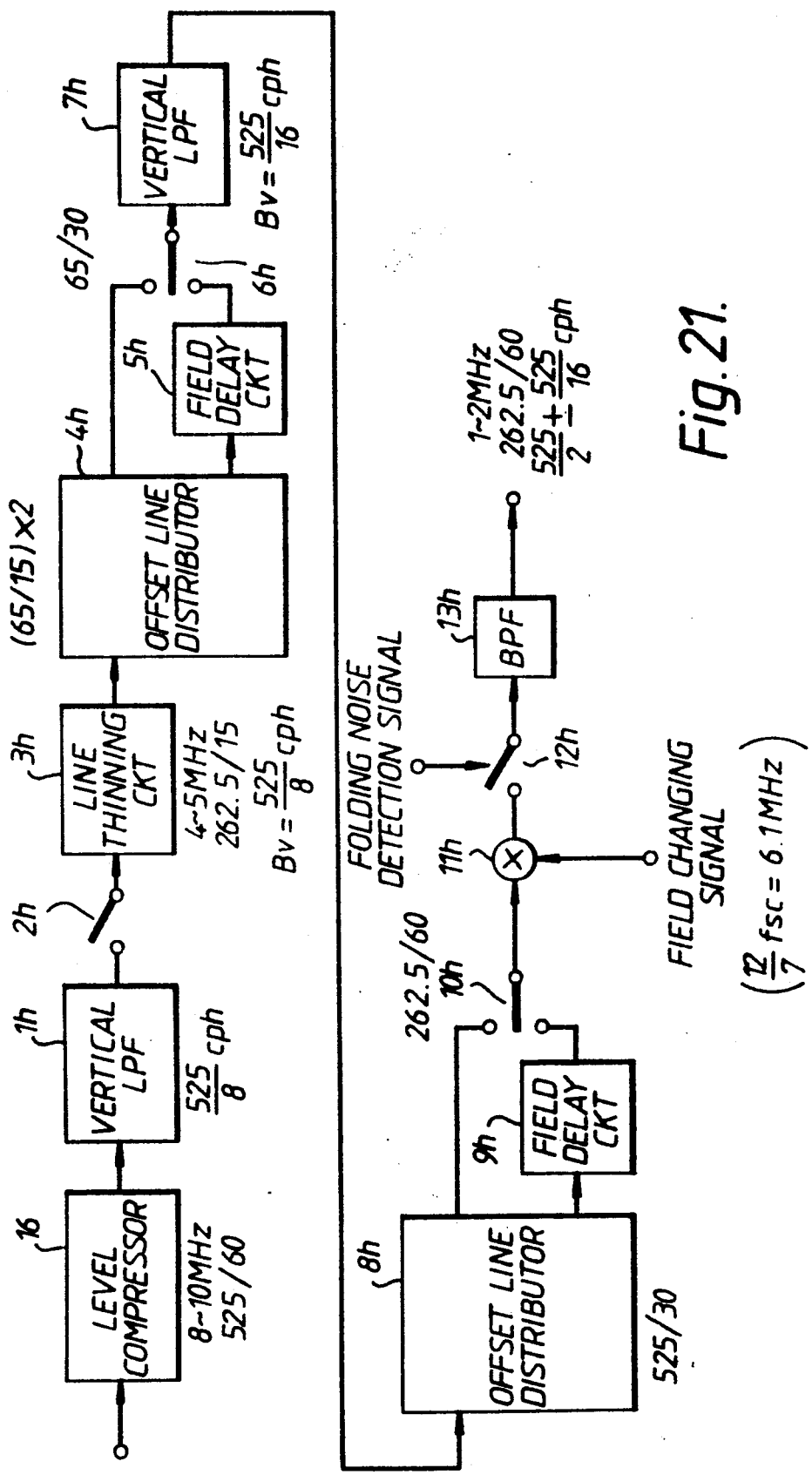
FIG. 21 is a block diagram showing the high frequency luminance signal encoder 17 of FIG. 3.

Referring now to FIG. 21, a detail of circuit comprising the luminance signal encoder 17 will be described. The high frequency luminance signal YH is given a two-dimensional frequency band, as shown by the rectangle YH in FIG. 6(a), for the transmission of the signal. The frequency band is presented as follows;

$$(525/2) \pm (1/16) \text{ cph (vertical frequency)} \times 1\text{-}2 \text{ MHz (horizontal frequency)}$$

By the way, only a static image region of the high frequency luminance signal YH is multiplexed.

A noise energy is reduced by the band suppression of the high frequency luminance signal YH. For decreasing disturbance occurring in NTSC television receivers, the amplitude of the high frequency luminance signal YH output from the luminance signal separator 15 (see FIG. 3) is lowered by the level compressor 16. The level compressor 16 is again indicated in FIG. 21. The level compressor 16 lowers the high frequency luminance signal YH with the frequency band of 8-10 MHz.

If the vertical frequency band of the signal YH is limited to a relatively narrow range. Thus, the vertical frequency band of the high frequency luminance signal YH output from the level compressor 16 is limited to the frequency band of 525/8 cph by a first vertical LPF 1h. A band limited signal output from the first vertical LPF 1h is applied to a first switch 2h. The first switch 2h is turned ON by one field period for every two frames. Thus, information corresponding to one field per two frames is obtained from the first switch 2h. This reduction of information does not cause any problem, because the signal encoder 17 is provided for transmission of the high frequency luminance signal of static images (see FIG. 3).

The information reduced high frequency luminance signal YH output from the first switch 2h is applied to a line thinning circuit 3h. The line thinning circuit 3h thins out the 525 scanning lines of the high frequency luminance signal YH by $\frac{1}{4}$ times, so that a signal with 131 scanning lines is obtained. The output signal with 131 scanning lines is applied to a first offset line distributor 4h. The first offset line distributor 4h distributes odd lines and even lines of the 131 scanning lines to two output terminals, respectively. One of the line groups, e.g., the odd lines are directly applied to a first input terminal of a second switch 6h. The other of the line groups, e.g., the even lines are applied to a second input terminal of the second switch 6h through a first field delay circuit 5h. The second switch 6h is operated in the frame frequency. Thus, a signal with 65 scanning lines and the frame frequency of 30 Hz is output from the second switch 6h.

The high frequency luminance signal YH with the 65 scanning lines and the frame frequency of 30 Hz is applied to a second vertical LPH 7h. The second vertical LPH 7h again converts the high frequency luminance signal YH with the 525 scanning lines. The signal output from the second vertical LPH 7h is applied to a second offset line distributor 8h. The second offset line distributor 8h distributes odd lines and even lines of the 131 scanning lines to two output terminals, respectively. One of the line groups, e.g., the odd lines are directly applied to a first input terminal of a third switch 10h. The other of the line groups, e.g., the even lines are applied to a second input terminal of the third switch 10h through a second field delay circuit 9h. The third switch 10h is operated in the frame frequency. Thus, a signal with 262.5 scanning lines and the frame frequency of 60 Hz is output from the third switch 10h.

The high frequency luminance signal YH with the 262.5 scanning lines and the frame frequency of 60 Hz is applied to a multiplier 12h. The multiplier 12h multiplexes the high frequency luminance signal YH with the 262.5 scanning lines and the frame frequency of 60 Hz with a subcarrier with a frequency of $(12/7) \cdot fsc$ ($=6.1$ MHz). The phase of the subcarrier is reversed for every field. Thus, a signal output from the multiplier 11h is converted to a signal with the region, as shown by the rectangle in FIG. 6(a). In other words, the high frequency luminance signal YH is shifted to the region. The high frequency luminance signal YH shifted to the region is applied to a BPF 13h through a fourth switch 12h. The fourth switch 12h is turned ON in response to a static image judging signal. The static image judging signal corresponds to, e.g., the selection control signal generated by the folding noise detector 9b (see FIG. 10). Thus, the high frequency luminance signal YH is applied to the BPF 13h in the case of static images. The BPF 13h limits the frequency band of the signal YH to 1–2 MHz. A signal output from the BPF 13h, i.e., the high frequency luminance signal YH obtained by the luminance signal encoder 17 is applied to the adder 26 (see FIG. 3).

Referring now to FIGS. 22 through 29, an embodiment of wide-screen television receivers according to the present invention will be described.

Figure 22:
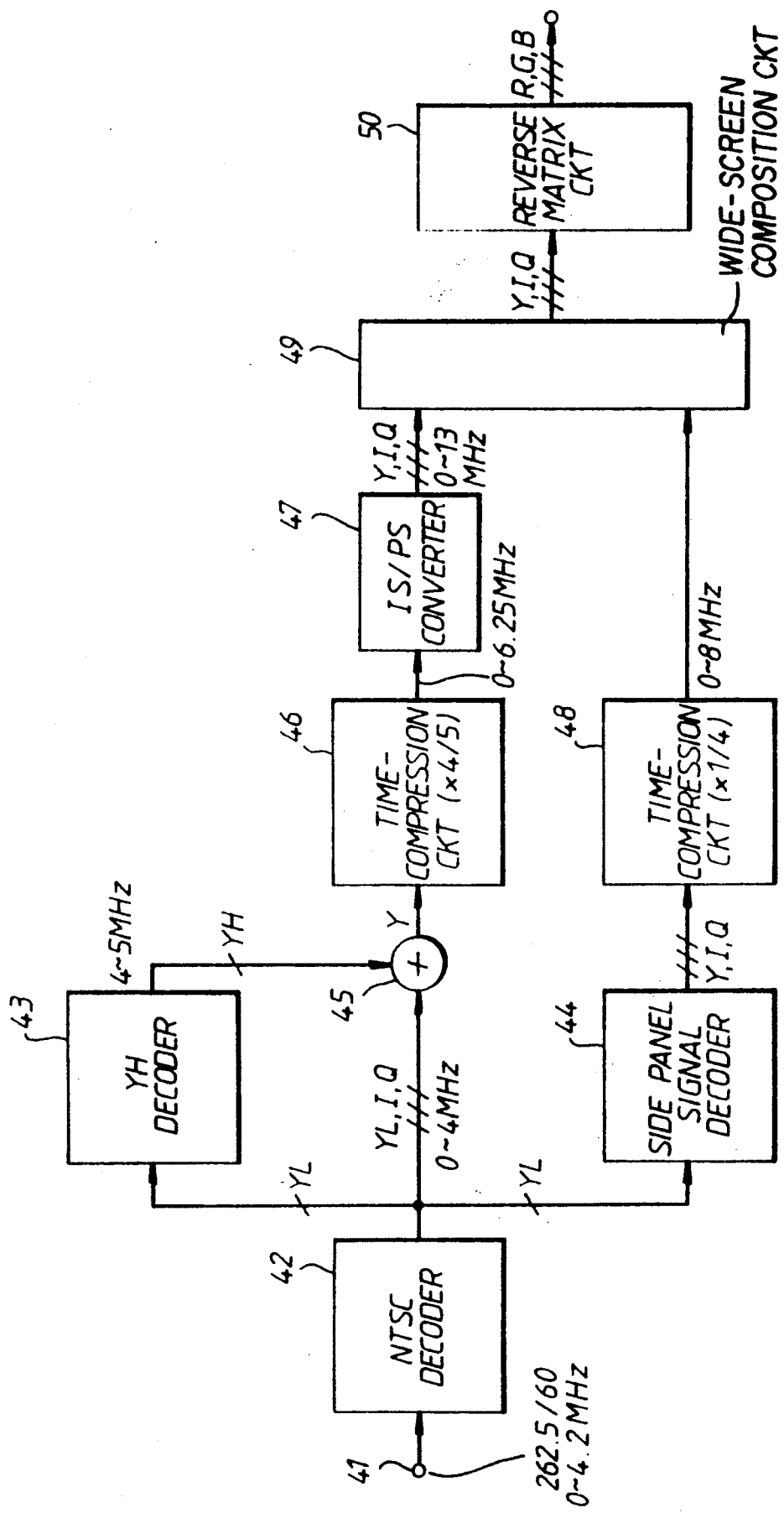
FIG. 22 is a block diagram showing a television receiver according to the present invention.

FIG. 22 shows a block diagram of a color television receiver according to the invention suited for the wide-screen television system as described above. In FIG. 22, an input terminal 41 is provided for receiving a wide-screen color television signal transmitted from a wide-screen television signal transmitter. The wide-screen color television signal is decoded by an NTSC decoder 42. Thus, color signals Y, I, Q are output from the NTSC decoder 42. In this embodiment, all the picture improving signals are contained in the luminance signal Y. Thus, the luminance signal Y output from the NTSC decoder 42 is provided for extracting the high frequency luminance signal YH and the side panel signals Ss.

In FIG. 22, the luminance signal Y is applied to both a high frequency luminance signal decoder 43 and a side panel signal decoder 44. The center panel signal Sc output from the NTSC decoder 43 is applied to an adder 45, as described later. In this embodiment, the high frequency luminance signal decoder 43 and the side panel signal decoder 44 are illustrated by circuit blocks independent from the NTSC decoder 42, as shown in FIG. 22, for the simplicity of explanation. In this circuit construction, the picture improving signals are processed by circuits provided for the center panel signal Sc. Thus the picture improving signals could cause disturbances in the circuits if circuits 42–44 were actually separate. However, these three circuits, 42 through 44, form a perfect whole in the practical circuit construction. Therefore, it is assured that these three circuits 42, through 44, are supplied with only signals to be processed in the respective circuit.

The high frequency luminance signal decoder 43 outputs the high frequency luminance signal YH with the frequency band of 4–5 MHz. The high frequency luminance signal YH output from the high frequency luminance signal decoder 43 is applied to the adder 45. The adder 45 combines the high frequency luminance signal YH and the low frequency luminance signal YL of the center panel signal Sc output from the NTSC decoder 42. Thus, the luminance signal Y with the frequency band of 0–5 MHz is obtained. The luminance signal Y is applied to a first time compression circuit 46. The first time compression circuit 46 compresses the time axis of the luminance signal Y to 4/5 times. Thus, the frequency band of the time compressed luminance signal Y is widened to 0–6.25 MHz. The time compressed luminance signal Y is applied to a first interlace scan/progressive scan converter (referred to as a IS/PS converter hereafter) 47. The IS/PS converter 47 converts the interlace scan signal of the time compressed luminance signal Y to a progressive scan signal. The progressive scan luminance signal Y has 525 scanning lines, a frame frequency of 60 Hz and a frequency band of 0–13 MHz. The progressive scan luminance signal Y is applied to a wide-screen composition circuit 49.

The side panel signal decoder 44 further carries out the IS/PS scanning conversion, as described later. Thus, the side panel signal Ss extracted from the side panel signal decoder 44 has 525 scanning lines. The decoded side panel signal Ss is applied to the wide-screen composition circuit 49 through a second time compression circuit 48. The second time compression circuit 48 compresses the time axis of the side panel signal Ss to ¼ times. Thus, the frequency band of the time compressed side panel signal Ss is widened to 0–8 MHz. Thus, the side panel signal Ss applied to the wide-screen composition circuit 49 has the 525 scanning lines and the frame frequency of 60 Hz which is the same as the progressive scan luminance signal Y applied from the IS/PS converter 47. However, the side panel signal Ss applied to the wide-screen composition circuit 49 has the frequency band of 0–8 MHz, narrower than the frequency band 0–13 MHz of the progressive scan luminance signal Y.

The wide-screen composition circuit 49 combines the progressive scan luminance signal Y and the side panel signal Ss so that the wide-screen television signal has the 16:9 aspect ratio. The wide-screen television signal comprises the wide-screen color signals Y, I, Q. These widescreen color signals Y, I, Q are applied to a conventional reverse matrix circuit 50. The reverse matrix circuit 50 converts the wide-screen color signals Y, I, Q to the original R, G, B components for supplying to a display (not shown).

Figure 23:
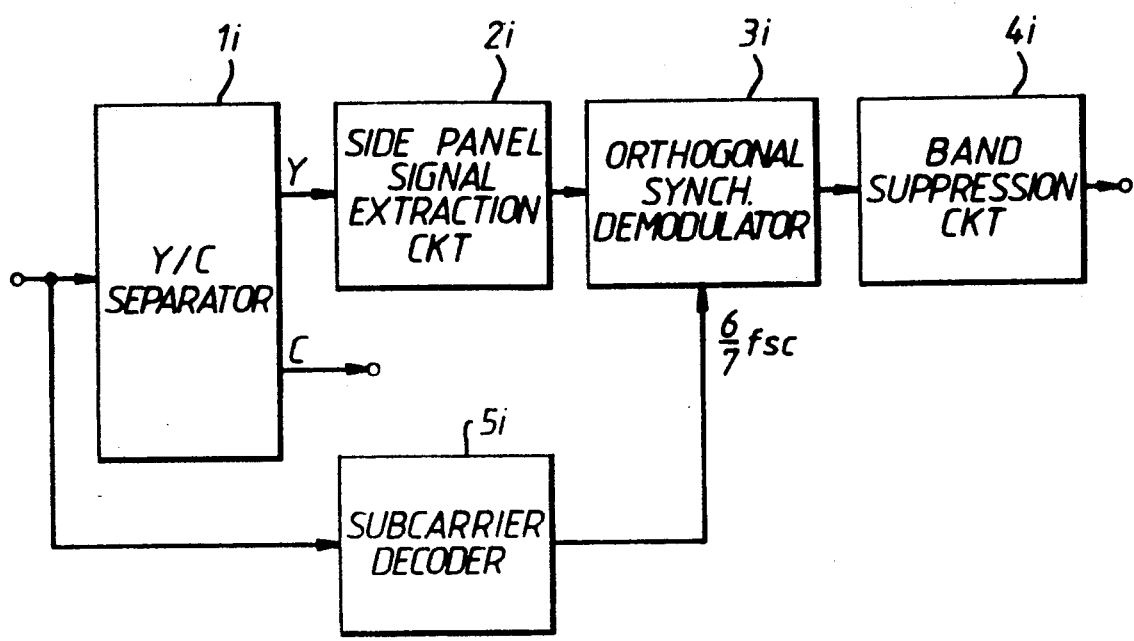
FIGS. 23 and 24 are block diagrams showing the side panel signal decoder 44 of FIG. 22.

Referring now to FIG. 23, a detail of a circuit comprising the side panel decoder 44 will be described. The side panel decoder 44 comprises a luminance signal/chrominance signal separator (referred to as a Y/C separator hereafter) 1i. The Y/C separator 1i extracts the luminance signal Y and the chrominance signal C from the signal output from the NTSC decoder 42 (see FIG. 22). The luminance signal Y is applied to a side panel signal extraction filter 2i. The side panel signal extraction filter 2i extracts the side panel signal Ss contained in the luminance signal Y. The side panel signal Ss is applied to an orthogonal synchronous demodulator 3i. The orthogonal synchronous demodulator 3i demodulates the side panel signal Ss by the subcarrier with the frequency of (6/7).fsc. Thus, the frequency band of the side panel signal Ss is shifted to a baseband before modulation in the transmitter. The side panel signal Ss with the baseband is applied to an output terminal of the circuit through a band suppression circuit 4i. The band suppression circuit 4i limits the frequency band of the decoded side panel signal Ss to a prescribed frequency range.

The subcarrier with the frequency of (6/7).fsc to be supplied to the orthogonal synchronous demodulator 3i is reproduced from the signal output from the NTSC decoder 42 by a subcarrier reproducing circuit 5i.

Figure 24:
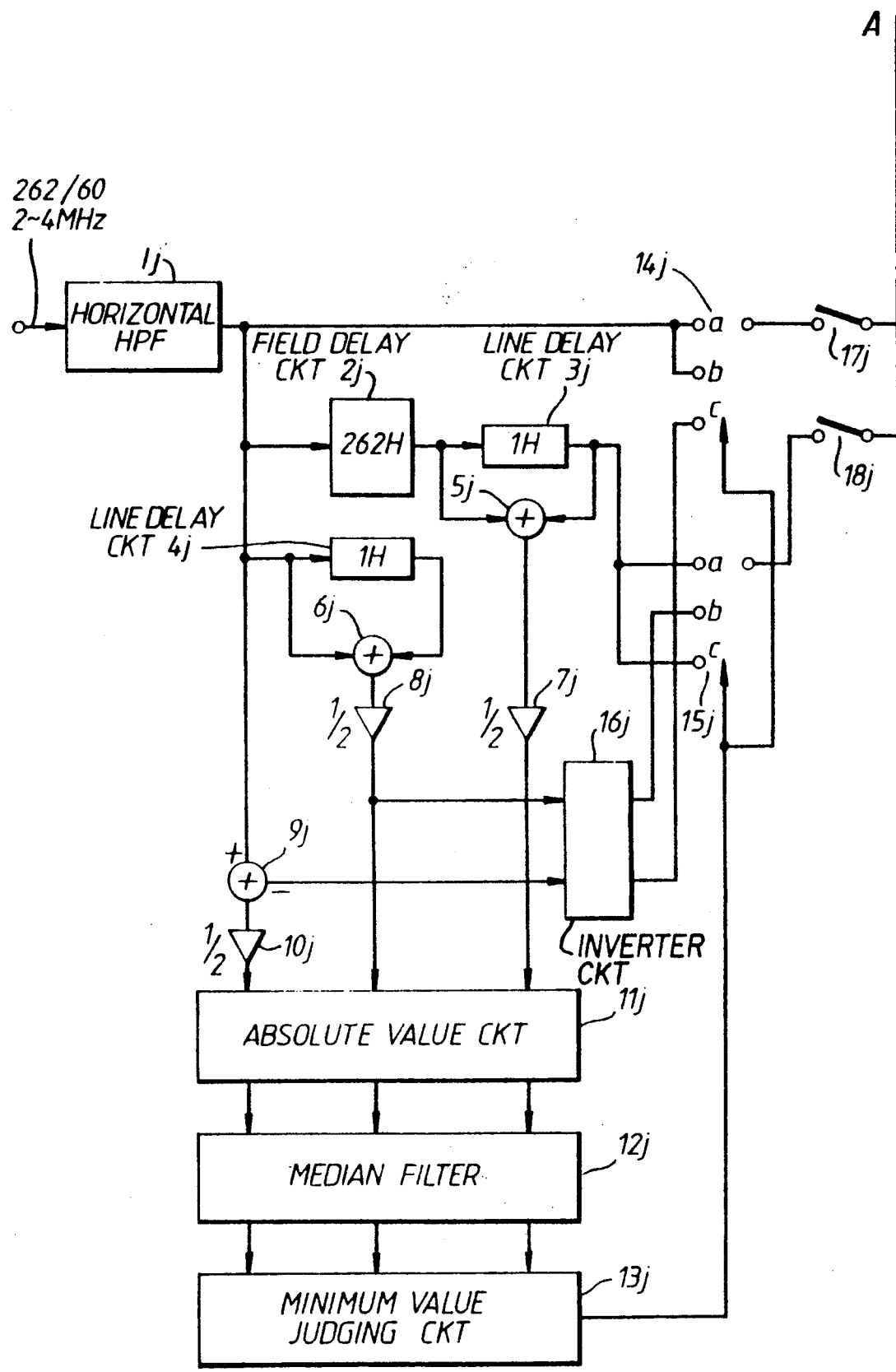
Figure 24:
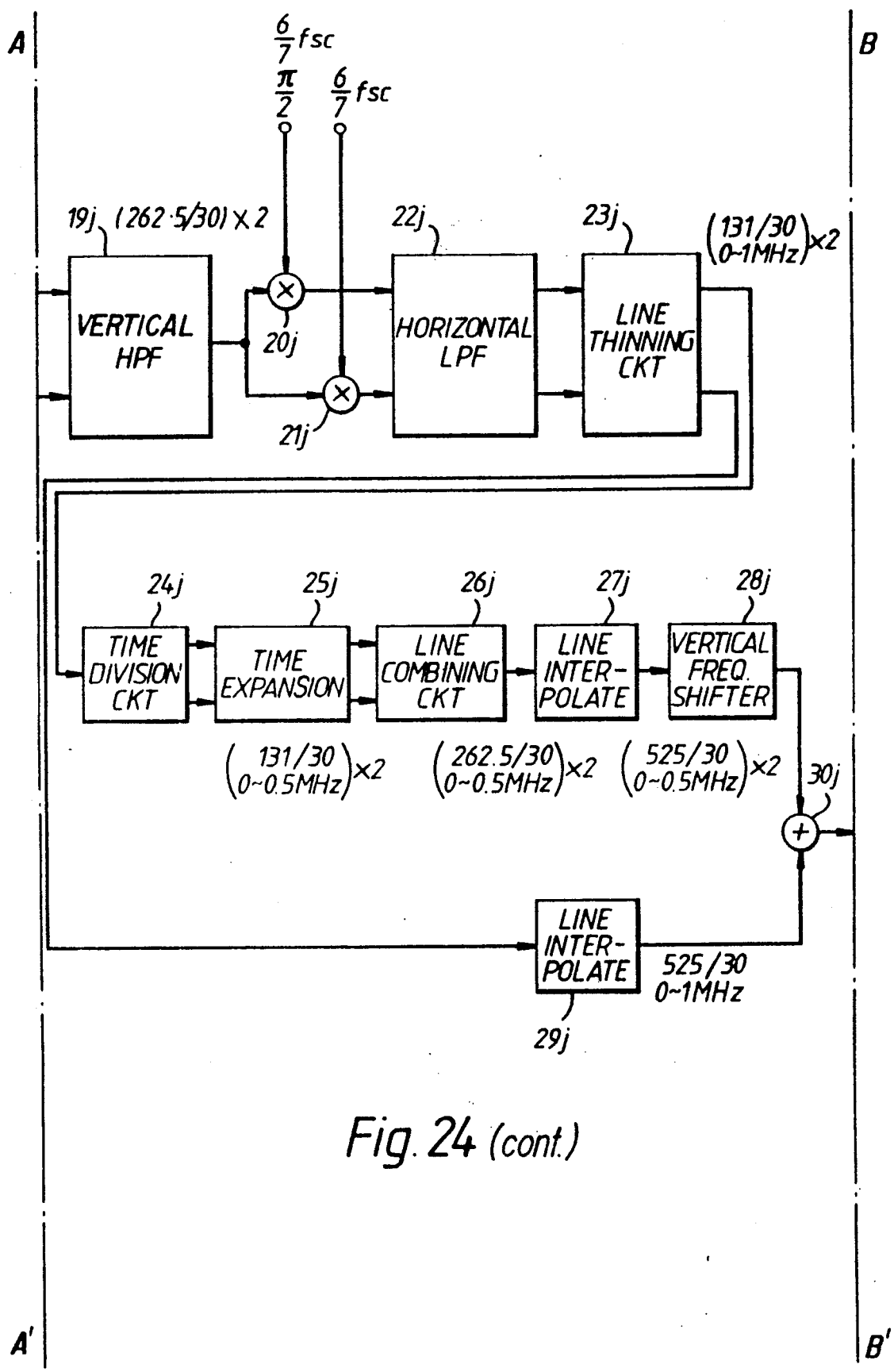
Figure 24:
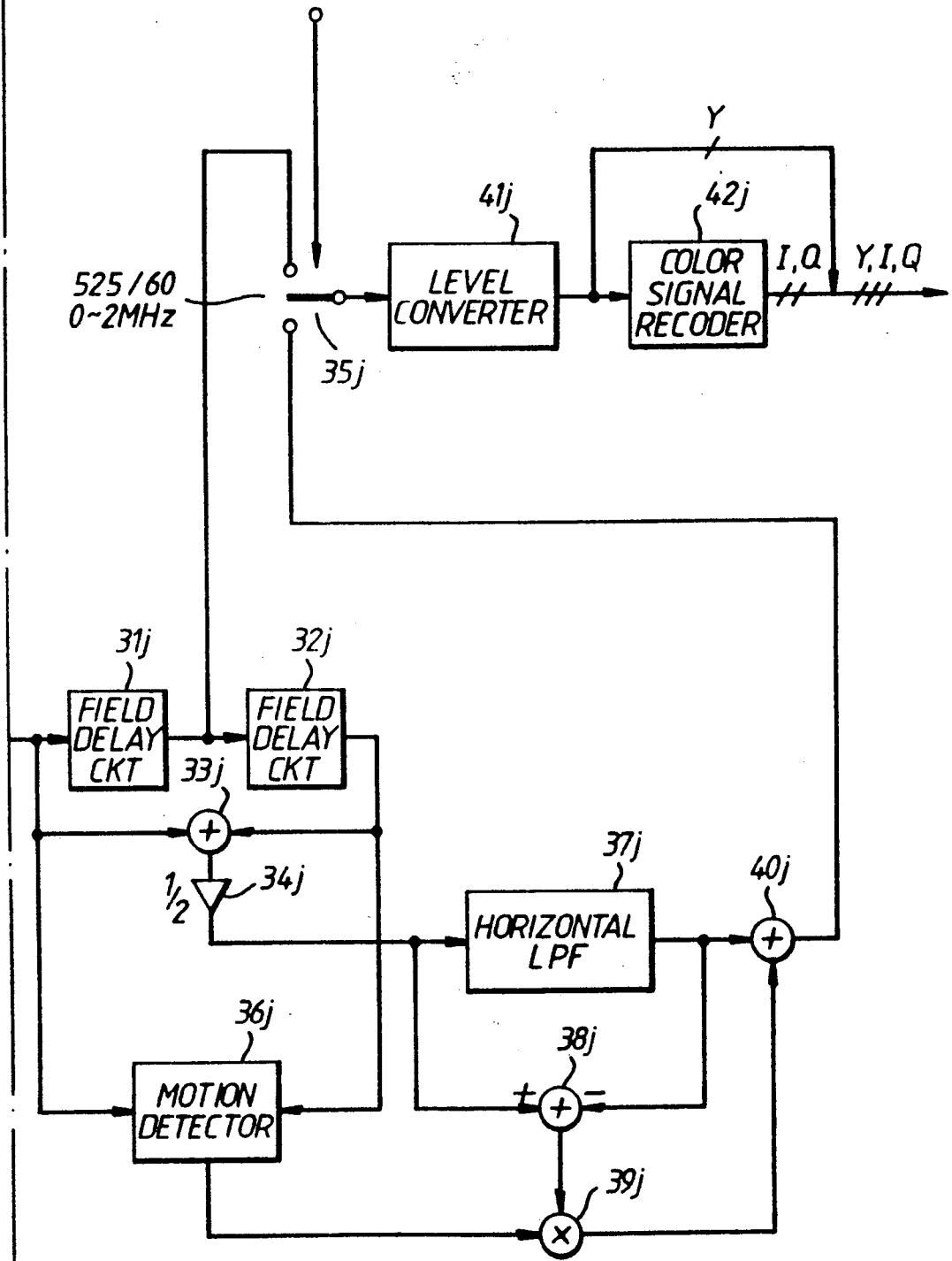

Referring now to FIG. 24, a detail of the circuit of FIG. 23, i.e., a more detailed diagram of the circuit comprising the side panel decoder 44, will be described. The circuit of FIG. 24, i.e., the side panel signal decoder 44 in FIG. 22 is subjected to decode the side panel signal Ss. The side panel signal Ss is transmitted as the signal multiplexed to the rectangle Ss in the 2-dimensional coordinate, as shown in FIG. 6.

In FIG. 24, a horizontal HPF 1j is provided for receiving the signal output from the NTSC decoder 42 (see FIG. 22). The horizontal HPF 1j limits the frequency band of the signal to 2-4 MHz for extracting information corresponding to the side panel signal Ss. Now, it is assumed that the "n+1" field signal is present on the input terminal of the horizontal HPF 1j. The "n+1" field signal and the prior "n" field signal have a very high corelation. This is because the side panel signal Ss is processed into the progressive scan signal with 525 scanning lines and the narrow frequency band of 525/8 cph in the transmitter. Thus, the "n+1" field signal and the "n" field signal are almost assumed as the same signal.

As shown in FIG. 14(b), one of the "n" and "n+1" field signals of the moving images includes the side panel signal Ss which is phase inverted for every field. However, the luminance signal is eliminated in the field signal. On the other hand, each field of the static image includes both the side panel signal Ss which is phase inverted for every field and the luminance signal which represents the same image.

The signal output from the horizontal HPF 1j is applied to a line signal averaging circuit for averaging two continuous lines. The line signal averaging circuit comprises a field delay circuit 2j, first and second line delay circuits 3j and 4j, first and second adders 5j and 6j and first and second ½ coefficient circuits 7j and 8j. The line signal averaging circuit outputs the side panel signal Ss from one of the "n" and "n+1" fields of the moving images, and also outputs both the side panel signal Ss and the luminance signal from the other field of the moving images.

Further, signals output from the horizontal HPF 1j and the second ½ coefficient circuit 7j are applied to a series circuit of a subtractor 9j and a third ½ coefficient circuit 10j. The subtractor 9j adds the side panel signals in the two different phase field signals, but cancels the luminance signals Y in the two different phase field signals, in case of the static images. Thus, the series circuit outputs only an average value of the side panel signals Ss in case of the static images. In case of the moving images, however, an average value of the luminance signals Y in the two different phase field signals are also output from the series circuit.

If a minimum one of the three average signals output from the first, second and third ½ coefficient circuits 7j, 8j and 10j can be selected, the selected signal always includes only the side panel signal Ss. In other words, the luminance signal Y is always eliminated from the selected signal. This is because the side panel signals Ss in the line average signals of the "n" and "n+1" field signals and the inverse fields average signal are the same, but at least one of the three average signals does not include the luminance signal Y.

Such a selection of the minimum one of the three average signals is carried out as follows. These three average signals output from the first, second and third ½ coefficient circuits 7j, 8j and 10j are applied to a minimum value judging circuit 13j through an absolute value circuit 11j and a median filter 12j. The absolute value circuit 11j takes an absolute value of each of the three average signals. The median filter 12j removes isolated noise components from each of the absolute value signals output from the absolute value circuit 11j. The minimum value judging circuit 13j selects a minimum one of the absolute value signals of the three average signals. The minimum value judging circuit 13j detects that a signal corresponding to the static images is present when at least two signals have the same minimum value. An algorithm carried out in the minimum value judging circuit 13j is a kind of minimum value judging operation. Thus, the selection of the minimum one of the three average signals is hardly affected by transmission noise.

Extractions of the side panel signal Ss and the luminance signal Y are carried out from a signal with 525 scanning lines. The signal with the 525 scanning lines can be obtained from both the "n" and "n+1" fields, in case of the static images. For obtaining such a signal with the 525 scanning lines, first and second switches 14j and 15j are provided. Each of the switches 14j and 15j has three input terminals a, b and c. Terminals a and b of the first switch 14j are coupled to the horizontal HF 1j. Terminal c of the first switch 14j is coupled to the first ½ coefficient circuit 7j through an inverter circuit 16j. Terminals a and c of the second switch 15j are coupled to the first line delay circuit 3j. Terminal b of the second switch 15j is coupled to the second ½ coefficient circuit 8j through the inverter circuit 16j. The first and second switches 14j and 15j are controlled by the judging signal output from the minimum value judging circuit 13j.

When the static image is present, both the "n" and "n+1" fields must be selected by the first and second switches 14j and 15j, as described above. In the processing of the "n+1" field, the second adder 6j and the second ½ coefficient circuit 8j takes the average value of two continuous scanning lines of the "n+1" field which has 262.5 scanning lines. The average value signal is applied to the terminal b of the second switch 15j through the inverter circuit 16j. The corresponding terminal b of the first switch 14j is coupled to the horizontal HPF 1j. Thus, the "n+1" field with the 262.5 scanning lines and the inverted average signal of the same "n+1" field are selected together by the first and second switches 14j and 15j. These selected signals are applied to a horizontal HPF 19j through third and fourth switches 17j and 18j.

In the processing of the "n" field, the first adder 5j and the first ½ coefficient circuit 7j takes the average value of two continuous scanning lines of the "n" field which has 262.5 scanning lines. The average value signal is applied to the terminal c of the first switch 14j through the inverter circuit 16j. The corresponding terminal c of the second switch 15j is coupled to the first line delay circuit 3j. Thus, the "n" field with the 262.5 scanning lines and the inverted average signal of the same "n" field are selected together by the second and first switches 15j and 14j. These selected signals are applied to the horizontal HPF 19j through third and fourth switches 17j and 18j.

Signals on the input terminals of the first and second switches 14j and 15j are present for one field period in every frame. Thus, the selected signals are transmitted to the vertical HPF 19j through the third and fourth switches 17j and 18j which are turned ON for 1/60 Sec.

The vertical HPF 19j has a frequency band of $(525/2) \pm (525/8)$ cph. Thus, the vertical HPF 19j extracts the side panel signal Ss from the selected signal. The side panel signal Ss extracted by the vertical HPF 19j is applied to first and second multipliers 20j and 21j. The first and second multipliers 20j and 21j orthogonally demodulate the side panel signals Ss in the conventional manner. The orthogonally related demodulation signals of the side panel signal Ss are applied to a horizontal LPF circuit 22j. The horizontal LPF circuit 22j limits the frequency band of the demodulation signals to 0–1 MHz. Thus, the side panel signals Ss with each 262.5 scanning lines and the frame frequency of 30 Hz are obtained. The side panel signals Ss output from the horizontal LPF circuit 22j are applied to a line thinning circuit 23j. The line thinning circuit 23j thins out prescribed scanning lines of the side panel signals Ss so that the signals Ss are converted to the signals with each 131 scanning lines. The information of the side panel signals Ss is preserved through the line thinning to 131 scanning lines, since the vertical frequency spectrum of the side panel signals Ss output from the horizontal LPF circuit 22j is limited to 525/8 cph.

One of the demodulated side panel signals Ss with the 131 scanning lines are provided for reproducing the signal with the frequency spectrum, as shown in FIG. 18(d). That is, the side panel signal Ss processed by the first multiplier 20j and then output from the line thinning circuit 23j is applied to a time expansion circuit 25j through a time division circuit 24j. The circuits 24j and 25j divide the side panel signal Ss into two signals, each with 131 scanning lines. The two signals are applied to a line combining circuit 26j. The line combining circuit 26j combines the two signals with the 131 scanning lines so that the side panel signal Ss with 131 scanning lines is converted to the signal with the frequency spectrum, as shown in FIG. 18(d).

The side panel signal Ss output from the line combining circuit 26j is applied to a first line interpolation circuit 27j. The first line interpolation circuit 27j interpolates scanning lines so that the side panel signal Ss is converted to the signal with 525 scanning lines. The side panel signal Ss with the 525 scanning lines is applied to a vertical frequency shifter 28j. The vertical frequency shifter 28j shifts the vertical frequency of the side panel signal Ss by 525/8 cph. Thus, a signal with the frequency spectrum, as shown in FIG. 18(c), is obtained by the vertical frequency shifter 28j. The side panel signal output from the vertical frequency shifter 28j is applied to an adder 30j.

On the other hand, the other one of the demodulated side panel signals Ss with the 131 scanning lines are provided for reproducing the signal with the frequency spectrum, as shown in FIG. 18(b). That is, the side panel signal Ss processed by the second multiplier 21j and then output from the line thinning circuit 23j is applied to a second line interpolation circuit 29j. The second line interpolation circuit 29j interpolates scanning lines so that the side panel signal Ss is converted to the signal with 525 scanning lines. The side panel signal Ss with the 525 scanning lines is applied to the adder 30j.

The adder 30j combines both the side panel signals Ss with the frequency spectrums, as shown in FIGS. 18(b) and 18(c). Thus, the side panel signal Ss with the frequency spectrum, as shown in FIG. 18(a), is output from the adder 30j.

The side panel signal Ss with the frequency spectrum, as shown in FIG. 18(a), occurs in every 1/30 sec. Then, the side panel signal Ss is provided for frame interpolation to produce the side panel signal Ss with the 525 scanning lines and the frame frequency of 60 Hz. That is, the side panel signal Ss output from the adder 30j is applied to a conventional frame interpolation circuit comprising first and second field delay circuits 31j and 32j, an adder 33j and a ½ coefficient circuit 34j. The first and second field delay circuits 31j and 32j are connected in series to the adder 30j. The adder 33j is coupled between the input terminal of the first field delay circuit 31j and the output terminal of the second field delay circuit 32j. The ½ coefficient circuit 34j is coupled to the output of the adder 33j.

The frame interpolation circuit outputs two frame interpolation signals from the first field delay circuit 31j and the ½ coefficient circuit 34j. These two frame interpolation signals are applied to a switch 35j. The switch 35j alternately selects the two frame interpolation signals at the frequency of 60 Hz. Thus, the side panel signal with the 525 scanning lines and the frame frequency of 60 Hz is obtained.

Figure 25:
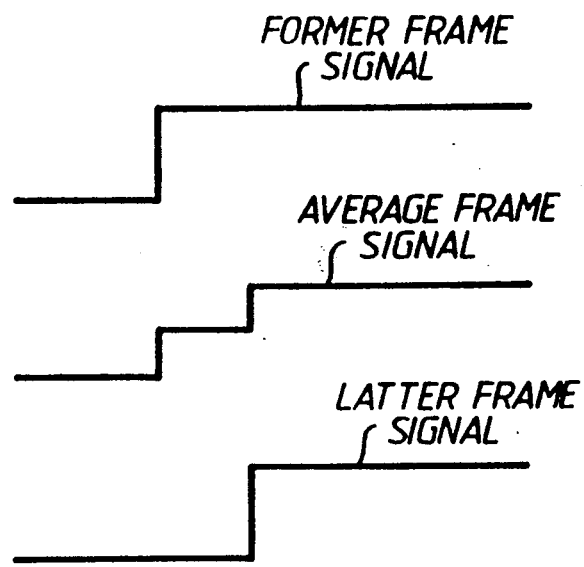
FIG. 25 is a graph for illustrating the operation of the circuit of FIG. 24.

The frame interpolation signal output from the ½ coefficient circuit 34j is made by taking an average of two continuous frames, as shown by graphs A and C in FIG. 25. Thus, the frame interpolation signal, as shown by graph B in FIG. 25, is obtained. Such a frame interpolation signal, however, causes an unnaturality of moving images. For improving the naturality of moving images, the frame interpolation circuit further includes a motion detection circuit. The motion detection circuit detects a motion of images between two continuous frames. When the circuit detects the motion of images, the circuit carries out suppression of high frequency component of the frame interpolation signal output from the ½ coefficient circuit 34j. Thus, the naturality of moving images can be improved.

The motion detection circuit comprises a motion detector 36j, a horizontal LPF 37j, a subtractor 38j, a multiplier 39j and an adder 40j. The motion detector 36j is coupled between the input terminal of the first field delay circuit 31j and the output terminal of the second field delay circuit 32j. The horizontal LPF 37j is coupled to the ½ coefficient circuit 34j. The subtractor 38j is coupled between the input and output terminals of the horizontal LPF 37j. The multiplier 39j is coupled between the motion detector 36j and the subtractor 38j. The adder 40j is coupled between the horizontal LPF 37j and the multiplier 39j.

The high frequency component of the interpolation signal output from the ½ coefficient circuit 34j is extracted by the horizontal LPF 37j and the subtractor 38j. That is, the high frequency component is obtained by subtracting the input and output signals of the horizontal LPF 37j. An amplitude of the high frequency component is suppressed by the motion detection signal in the multiplier 39j. The suppressed high frequency component is combined with the low frequency component output from the horizontal LPF 37j in the adder 40j. Thus, a motion improved frame interpolation signal is obtained.

The selected frame interpolation signal output from the switch 35j is the frame interpolated side panel signal Ss corresponds to the inverse phase signal of the time-division multiplex signal output from the amplitude suppressing circuit 24 of FIG. 3. Thus, the phase and the amplitude of the frame interpolated side panel signal Ss are restored to the original states corresponding to the time-division multiplex signal in FIG. 3 in a level converter 41j which includes an inverter (not shown). The side panel signal Ss output from the level converter 41j is applied to a color signal decoder 42j. The color signal decoder 42j decodes the luminance signal Y and the color difference signals I and Q from the side panel signal Ss.

Figure 26:
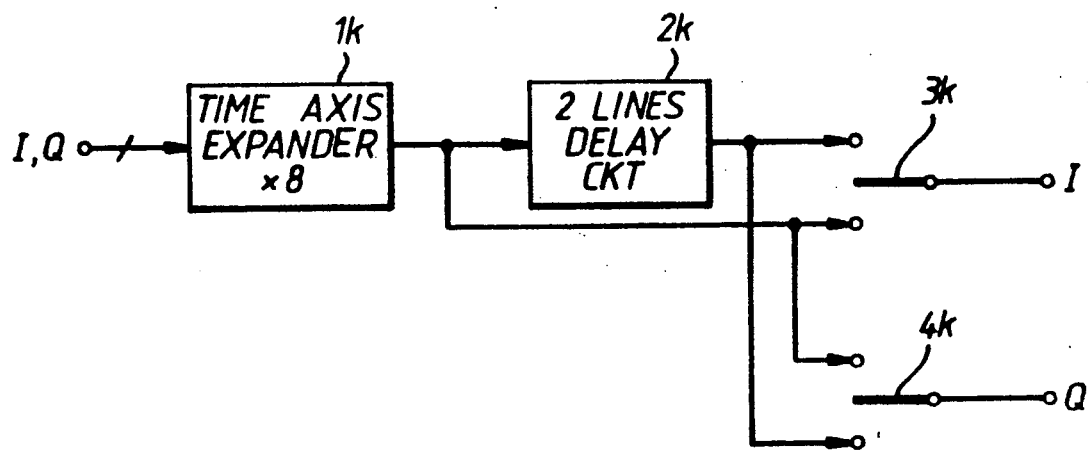
FIG. 26 is a block diagram showing the color decoder 42j of FIG. 24.

Referring now to FIG. 26, a detail of circuit comprising the color signal decoder 42j will be described. In FIG. 26, a time expansion circuit 1k is provided for receiving the side panel signal Ss output from the level converter 41j of FIG. 24. The side panel signal Ss output from the level converter 41j has the 525 scanning lines and the frame frequency of 60 Hz, as described above. The time axes of the color difference signals I and Q in the side panel signal Ss are expanded for 8 times by the time expansion circuit 1k. The time expansion signal output from the time expansion circuit 1k is applied to first and second switches 3k and 4k. That is, the time expansion signal is applied to a first input terminal of the first switch 3k and a second input terminal of the second switch 4k through a two lines delay circuit (referred to as a 2H delay circuit hereafter) 2k. Further, the time expansion signal is directly applied to a second input terminal of the first switch 3k and a first input terminal of the second switch 4k. The first and second switches 3k and 4k are changed in the frequency corresponding to every two periods of the horizontal frequency period, i.e., 2H period. Thus, one of the color difference signals, e.g., the signal I is obtained from the first switch 3k. The other color difference signal, e.g., the signal Q is obtained from the second switch 4k.

The wide-screen composition circuit 49 of FIG. 22 principally has a function to timely select the center panel signal Sc and the side panel signal Ss output from the IS/PS converter 47 and the second time compression circuit 48, respectively. An input section of the wide-screen composition circuit 49 may comprises a level adjusting circuit for smoothing respective borders between the center panel F1 and the side panel F2 on the screen of television receivers (see FIG. 4).

Figure 27:
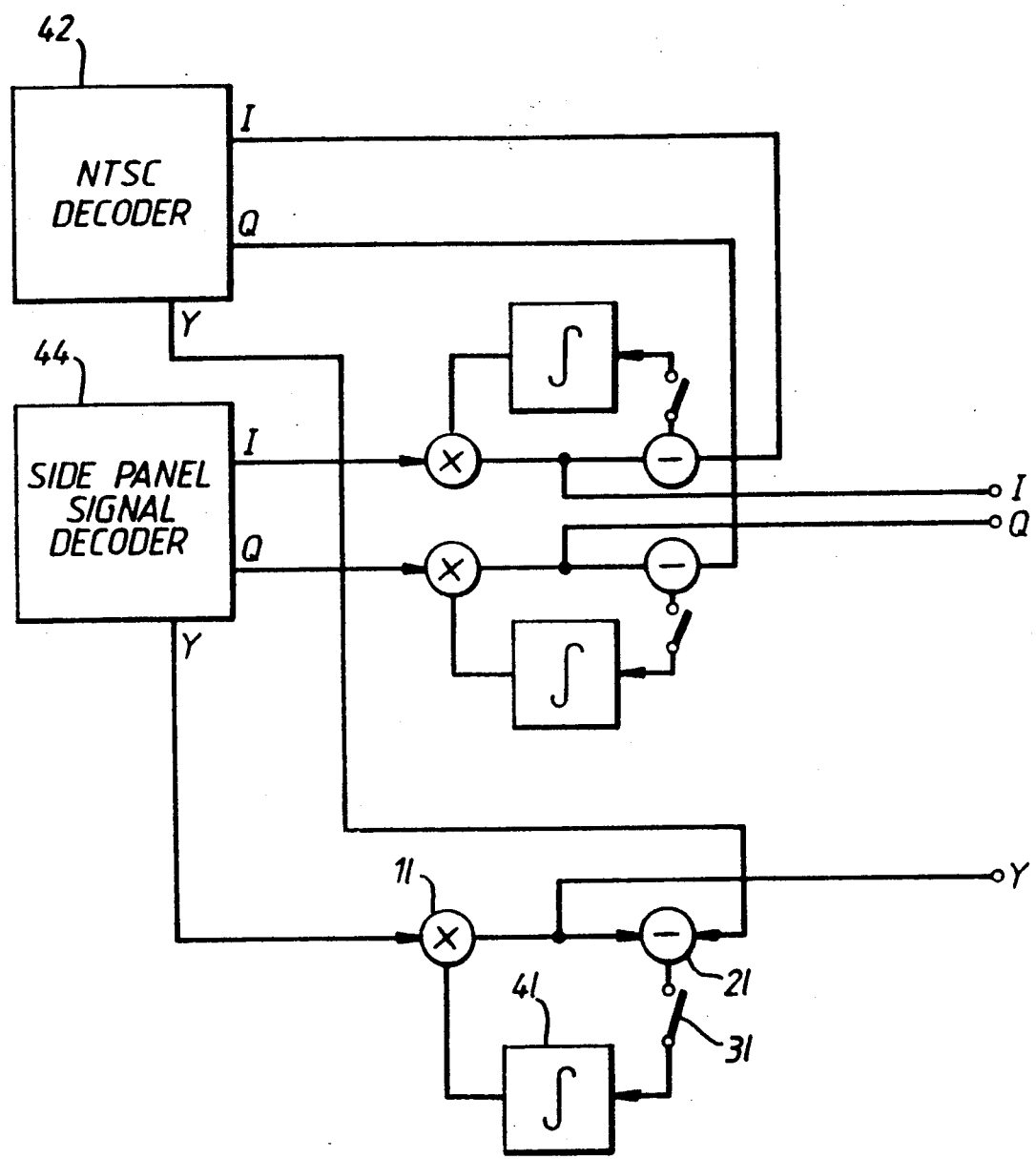
FIG. 27 is a block diagram showing the wide-screen combining circuit 49 of FIG. 22.

Referring now to FIG. 27, the level adjusting circuit will be described. In FIG. 27, the level adjusting circuit comprises three sets of level adjusters. The first level adjuster is coupled between luminance signal Y transmission lines coupled to the NTSC decoder 42 and the side panel signal decoder 44. The second level adjuster is coupled between color difference signal I transmission lines coupled to the NTSC decoder 42 and the side panel signal decoder 44. The third level adjuster is coupled between color difference signal Q transmission lines coupled to the NTSC decoder 42 and the side panel signal decoder 44. Each of the level adjusters comprises a multiplier 11, a subtractor 21, a switch 31 and an integrator 41. The multiplier 11 and the subtractor 21 are coupled in series between the side panel signal decoder 44 and the NTSC decoder 42. The switch 31 and the integrator 41 are coupled in series between the multiplier 11 and the subtractor 21.

Figure 28:
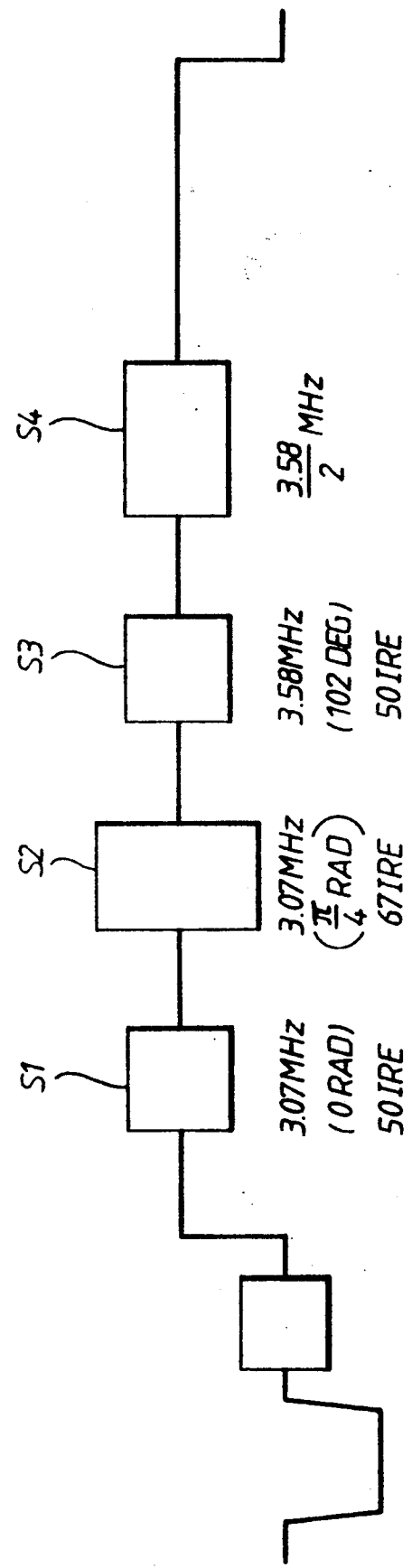
FIG. 28 is a graph for illustrating the operation of the circuit of FIG. 27.

The wide-screen color television signal received at the input terminal 41 of FIG. 22 includes control signals. The control signals are multiplexed on a vertical blanking period of the wide-screen color television signal, as shown in FIG. 28.

The level of the wide-screen color television signal in the vertical blanking period is used as a level reference for the center panel signal Sc.

A first control signal S1 has a frequency of $3.07[=(6/7)\cdot fsc]$ MHz and a phase of 0 radian. The first control signal S1 also has an amplitude of 50 IRE and a continuation time of 6–7 cycles. The first control signal S1 is used as a reference phase signal for reproducing the subcarrier for decoding the side panel signal Ss. The level of the wide-screen color television signal in the vertical blanking period and the first control signal S1 are also used as references for bright adjusting.

A second control signal S2 also has the frequency of 3.07 MHz and a phase of $\pi/4$ radian. The second control signal S2 has an amplitude of 67 IRE. The second control signal S2 is used as a reference level signal for reproducing the color difference signals I and Q of the side panel signal Ss.

A third control signal S3 has a frequency of 3.58 MHz and a phase of 102° (degree). The third control signal S3 has an amplitude of 50 IRE. The third control signal S3 is used as a reference level signal for reproducing the color difference signals I and Q of the center panel signal Sc.

A fourth control signal S4 has the frequency of 3.58/2 MHz. The fourth control signal S4 is formed as a binary NRZ (non return to zero) signal. The fourth control signal S4 is used for transmitting the timing control signal Un, as shown in FIG. 9. The wide-screen television receiver selects the center panel signal Sc and the side panel signal Ss according to the timing control signal Un decoded from the fourth control signal S4 for composing the wide-screen aspect ratio image, e.g., the 16:9 aspect ratio image.

These control signals S1–S4 are reproduced by the NTSC decoder 42 (see FIGS. 22 and 27). In FIG. 27, it is assumed that the levels of the color signals Y, I and Q are adjusted to the level of the wide-screen color television signal in the vertical blanking period in the NTSC decoder 42 and the side panel signal decoder 44.

Now, the operation of the level adjusters of FIG. 27 will be described. The three level adjusters have the same circuit construction, as described above. Thus, the level adjuster coupled between luminance signal Y transmission lines will be representatively described. The luminance signal Y output from the side panel signal decoder 44 is applied to the multiplier 11. The multiplier 11 multiplies the side panel luminance signal Y with a feedback control signal output from the integrator 41. Thus, the amplitude of the side panel luminance signal Y output from the multiplier 11 is controlled in accordance with the feedback control signal. The subtractor 21 takes an error signal between the side panel luminance signal Y output from the multiplier 11 and the center panel luminance signal Y output from the NTSC decoder 42. The error signal is applied to the multiplier as the feedback control signal through the switch 31 and the integrator 41. The switch 31 turns ON for the operation period of the subtractor 21. The integrator 41 integrates the subtraction signal so that the feedback control signal is produced. The level adjuster carries out a negative feedback operation for reducing the error signal. Thus, the side panel luminance signal Y and the center panel luminance signal Y are adjusted to have the same controlled amplitude in accordance with the negative feedback operation. The amplitude controlled luminance signal Y is output from the multiplier 11.

In the same manner, the color difference signals I and Q are adjusted by the corresponding level adjusters, respectively.

Figure 29:
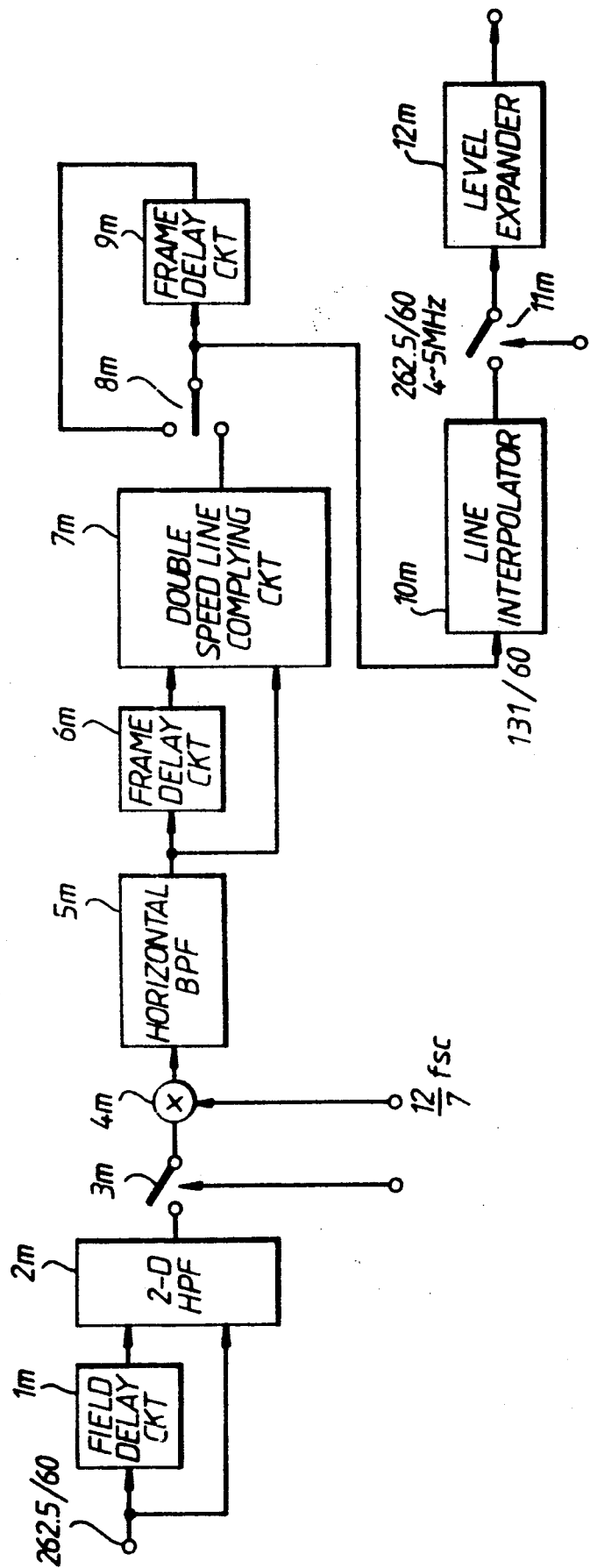
FIG. 29 is a block diagram showing the high frequency luminance signal decoder 43 of FIG. 22.

Referring now to FIG. 29, a detail of a circuit comprising the high frequency luminance signal decoder 43 will be described. In FIG. 29, a field delay circuit 1m is provided for receiving the signal decoded by the NTSC decoder 42 (see FIG. 22). The signal contains the information of the high frequency luminance signal YH. The high frequency luminance signal YH contained in the signal has the frequency band of 525/8 cph in vertical frequency and the horizontal frequency of 4–5 MHz. The information is contained in one frame for every two frame.

Now, the signal as the center panel signal with static images is provided for extracting the high frequency luminance signal YH. The center panel signal Sc output from the NTSC decoder 42 has 262.5 scanning lines. The center panel signal Sc is applied to a 2-dimensional HPF 2m through the field delay circuit 1m. Further, the center panel signal Sc is directly applied to the 2-dimensional HPF 2m. Thus, two continuous fields of the center panel signal Sc are applied to the 2-dimensional HPF 2m. The 2-dimensional HPF 2m extracts a signal with the vertical frequency band of $(525/2)\pm(525/16)$ cph and the horizontal frequency band of 1–2 MHz. The effective information of the high frequency luminance signal YH is contained in one prescribed field of every frame of the signal output from the 2-dimensional HPF 2m. The signal (referred to as a high frequency luminance signal Y hereafter) is applied to a field selector switch 3m. The field selector switch 3m is controlled by a field selection signal so that the switch 3m turns ON for the period corresponding to the effective field. The high frequency luminance signal Y contained in the effective field selected by the switch 3m is applied to a multiplier 4m. The multiplier 4m demodulates the high frequency luminance signal Y by a subcarrier with the frequency of (12/7).fsc. Thus, the high frequency luminance signal Y with a base band before modulation in the transmitter is obtained. The demodulated high frequency luminance signal Y is applied to a horizontal BPF 5m. The horizontal BPF 5m limits the frequency band of the high frequency luminance signal Y to 4–5 MHz. The high frequency luminance signal Y output from the horizontal BPF 5m has 65 scanning lines and the frame frequency of 30 Hz. The high frequency luminance signal Y output from the horizontal BPF 5m is applied to a double speed line combining circuit 7m through a frame delay circuit 6m. Further, the high frequency luminance signal Y is directly applied to the double speed line combining circuit 7m. Thus, two continuous frames are applied to the double speed line combining circuit 7m. The double speed line combining circuit 7m converts the high frequency luminance signal Y to the signal with 131 scanning lines and the frame frequency of 15 Hz.

The high frequency luminance signal Y output from the double speed line combining circuit 7m is applied to both a frame delay circuit 9m and a line interpolator 10m through a switch 8m. The double speed line combining circuit 7m is coupled to a first input terminal of the switch 8m. The second input terminal of the switch 8m is coupled to the output terminal of the frame delay circuit 9m. The switch 8m is controlled by a prescribed control signal so that the first input terminal is turned ON for a first field period in every four fields. On the other hand, the second input terminal is turned ON for the following three continuous fields period in every four field. Thus, the one of continuous four fields of the high frequency luminance signal Y output from the double speed line combining circuit 7m is applied to the line interpolator 10m. At that time, the field is applied to the frame delay circuit 9m. In each field period of the following three continuous fields period, the same delayed signals of the high frequency luminance signal Y output from the frame delay circuit 9m are repetitively applied to the line interpolator 10m. According to the switching operation of the switch 8 m, the frame ferquency of the high frequency luminance signal Y output from the switch 8 m becomes equivalent to the frame frequency of 60 Hz. The line interpolator 10 interpolates scanning lines for the high frequency luminance signal Y so that the high frequency luminance signal Y is converted to teh signal with 525 scanning lines and the frame frequency of 60 Hz. The line interpolated signal is applie to a level expander 12m through a switch 11m. The switch 11m is turned ON in response to a static image judging signal. The static image judging signal corresponds to, e.g., the selection control signal generated by the folding noise detector 9b (see FIG. 10). Thus, the high frequency luminance signal YH is applied to the level expander 12m in the case of static images. The level expander 12m has a level expansion characteristic inverse to the level compressor 16 of FIG. 3. Thus, the level expander 12m expands the amplitude of the high frequency luminance signal Y to the original amplitude of the high frequency luminance signal Y in teh transmitter. The high frequency luminance signal Y output from theTlevel expander 12m applied to the adder 45 of FIG. 20.

As described above, the present invention has following effects:

(1) The television signal according to the present invention has little disturbance against signals for existing television receivers.

This is because the picture improving signals are multiplexed to the 2-dimensional high frequency region, e.g., the region in the horizontal frequency of over 2 MHz and the vertical frequency of $3 \times 525/8$ cph of the television signal. Such a 2-dimensional high frequency region does not contribute to the human eyesight. Thus, the multiplexed picture improving signal does not affect reception by the existing television receivers.

(2) The picture improving signals according to the present invention are effective for both static images and moving images.

This is because the high frequency luminance signal of moving images is multiplexed by thinning out a prescribed field in the horizontal frequency region over, e.g., 2 MHz and the vertical frequency region under $3 \times 525/8$ cph.

In the above description, the transmitters and receivers for the NTSC system are exemplified. However, the present invention can be applied to other television systems such as the PAL system or the SECOM system. Further, the present invention can be applied to other systems with increased scanning lines, e.g., 1125 scanning lines system, 1250 scanning lines system, 1050 scanning lines system etc.

As described above, the present invention can provide an extremely preferable color television system.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A color television system comprising:
   means for generating a wide aspect ratio screen color television signal with a predetermined two-dimensional frequency band;
   means for separating the color television signal into at least a first television signal relating to a relatively narrow aspect ratio and a second television signal relating to an excess portion thereover, said first television signal having a high frequency region and a low frequency region and said second television signal having a high frequency region and a low frequency region;
   means for eliminating a prescribed portion of said high frequency region of the two-dimensional frequency band of the first television signal to obtain a resulting signal;
   means for time expanding both the high and low frequency regions of the second television signal;
   means for suppressing the frequency band of both the high and low frequency regions of the second television signal;
   means for multiplexing the suppressed second television signal onto the two-dimensional resulting signal and low frequency region of said first television signal; and
   means for motion adapted processing of the low frequency region of the first television signal.

2. The system of claim 1 wherein said means for motion adapted processing includes:
   static-image processing means for outputting a first signal;
   moving image processing means for outputting a second signal;
   folding noise detecting means for generating a detection signal; and
   selecting means for selecting one of the first and second signals in response to said detection signal.

3. The system of claim 2 wherein said moving image processing means includes field thinning means.

4. A color television system comprising:
   means for generating a wide aspect ratio screen color television signal with a predetermined two-dimensional frequency band;
   means for separating the color television signal into at least a first television signal relating to a relatively narrow aspect ratio portion and second television signal relating to an excess portion thereover, said first television signal having a high frequency region and a low frequency region and said second television signal having a high frequency region and a low frequency region;
   means for eliminating a prescribed portion of said high frequency region of the two-dimensional frequency band of the first television signal to obtain a resulting signal;
   means for time expanding both the high and low frequency regions of the second television signal;
   means for suppressing the frequency band of both the high and low frequency regions of the second television signal;
   means for separating the second television signal into vertical high frequency and vertical low frequency signals and orthogonally modulating the vertical high frequency and vertical low frequency signal to obtain a combined orthogonally modulated signal; and
   means for multiplexing the suppressed combined orthogonally modulated signal onto the two-dimensional resulting signal and low frequency region of said first television signal.

* * * * *